United States Patent
Ishikawa et al.

(10) Patent No.: US 6,510,052 B2
(45) Date of Patent: Jan. 21, 2003

(54) COOLING UNIT FOR COOLING A HEAT GENERATING COMPONENT AND ELECTRONIC APPARATUS HAVING THE COOLING UNIT

(75) Inventors: Kenichi Ishikawa, Hamura (JP); Katsumi Hisano, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/955,091

(22) Filed: Sep. 19, 2001

(65) Prior Publication Data

US 2002/0039279 A1 Apr. 4, 2002

(30) Foreign Application Priority Data

Sep. 21, 2000 (JP) ......................................... 2000-287691

(51) Int. Cl.$^7$ ........................... H01L 23/427; H05K 7/20
(52) U.S. Cl. ....................... 361/687; 361/695; 361/699; 165/104.33; 174/15.1; 257/714
(58) Field of Search ................................. 361/683, 687, 361/699, 704, 706–707, 712–714, 717–719; 165/104.33, 104.27, 108, 104.25, 104.32, 80.4; 257/714–715; 364/708.1; 345/87; 359/44, 48, 49, 86, 214; 417/13, 44.8, 92, 366, 377; 415/114, 177, 178; 174/15.1, 15.2, 16.3

(56) References Cited

U.S. PATENT DOCUMENTS 5,646,824 A * 7/1997 Ohashi et al. ............... 361/699
5,764,483 A * 6/1998 Ohashi et al. ............... 361/699

FOREIGN PATENT DOCUMENTS

| JP | 406120384 A | * | 4/1994 | ......... H01L/23/427 |
| JP | 7-142886 | | 6/1995 | |
| JP | 9-113158 | | 5/1997 | |
| JP | 11-087955 | | 3/1999 | |
| JP | 11-259181 | | 9/1999 | |
| JP | 02001024372 A | * | 1/2001 | ............ H05K/7/20 |

OTHER PUBLICATIONS

Copy of U.S. patent application Ser. No. 09/151,031, filed Sep. 10, 1998, to Hisano et al.

* cited by examiner

Primary Examiner—Darren Schuberg
Assistant Examiner—Michael Datskovsky
(74) Attorney, Agent, or Firm—Finnegan, Henderson, Farabow, Garrett & Dunner, L.L.P.

(57) ABSTRACT

An electronic apparatus comprises a housing for accommodating a heat generating component and a display unit supported by the housing. A heat receiving head thermally connected to the heat generating component is accommodated inside the housing. A heat radiator is disposed in the display unit. A heat receiving head and the heat radiator are connected to each other through a circulating path for circulating cooling medium. The circulating path is provided with an intermediate cooling unit. Before cooling medium heated by heat transfer by the heat receiving head reaches the heat radiator, the intermediate cooling unit forces cooling medium to be cooled.

20 Claims, 10 Drawing Sheets

COOLING UNIT FOR COOLING A HEAT GENERATING COMPONENT AND ELECTRONIC APPARATUS HAVING THE COOLING UNIT

CROSS-REFERENCE TO RELATED APPLICATIONS

This application is based upon and claims the benefit of priority from the prior Japanese Patent Application No. 2000-287691, filed Sep. 21, 2000, the entire contents of which are incorporated herein by reference.

BACKGROUND OF THE INVENTION

1. Field of the Invention

The present invention relates to a cooling unit for forcing a heat generating component like a semiconductor package to be cooled with liquid-like cooling medium and an electronic apparatus provided with the cooling unit, such as a portable computer.

2. Description of the Related Art

An electronic apparatus like a portable computer has a micro processing unit (MPU) for processing multi-media information such as characters, voices and animation. This MPU tends to increase generation of heat during its operation accompanied by currently increased processing speed and multiple functions. Thus, in order to ensure a stable operation of the MPU, it is necessary to intensify heat radiation performance of this MPU.

Conventionally, a portable computer loaded with a MPU generating a large amount of heat is equipped with an air-cooling type cooling unit for forcing the MPU to be cooled. This cooling unit has a heat sink thermally connected to the MPU and an electric fan for supplying cooling air to this heat sink.

In this cooling unit, heat from the MPU is transmitted to the heat sink and then discharged out of the computer through a flow of cooling air. Therefore, because according to the conventional cooling method, cooling air serves as a cooling medium for depriving the MPU of heat, the cooling performance of the MPU mostly depends on air feeding performance of the electric fan. If the feeding amount of cooling air is increased to aim at intensifying cooling performance of the MPU, the rotation amount of the electric fan is increased, so that there is produced such a problem that a large noise may be produced. Additionally, because in the portable computer, a housing for incorporating the MPU and electric fan is designed so thin in a compact body, it is difficult to secure a space for accommodating a large electric fan having an excellent air feeding performance and an ideal air feeding path inside the housing.

In near future, it is expected that the processing speed of the MPU for the portable computer will be further accelerated and the MPU will become multi-functional, and accompanied by this trend, the heat generation of the MPU increases tremendously. Thus, the conventional forced air-cooling system has a fear that the cooling capacity for the MPU becomes short or reaches its limit.

As a means for improving this, for example, Jpn. Pat. Appln. KOKAI Publication No. 7-142886 has disclosed so-called liquid cooling system employing liquid having a higher specific heat than air as heat transferring medium.

According to this new cooling system, a heat receiving header connected to the MPU thermally is disposed inside the housing and a heat radiating header is disposed inside the display housing supported by this housing. The heat receiving header and the heat radiating header are connected to each other through a circulating pipe in which liquid-like cooling medium flows.

Because according to this cooling system, cooling medium circulates between the heat receiving header and the heat radiating header, heat from the MPU is transmitted to the heat receiving header and after that, transferred to the heat radiating header via the cooling medium. Heat transferred to the heat radiating header is discharged to the atmosphere by diffusion by heat conduction to the display housing. For the reason, the heat radiating header is connected thermally to the display housing and the display housing is composed of metallic material having excellent heat conductivity.

Therefore, such liquid cooling system is capable of transferring heat of the MPU more effectively than the conventional forced air cooling system, thereby raising the cooling performance of the MPU.

Meanwhile, heat of the MPU transferred from the heat radiating header to the display housing is discharged to the atmosphere from the surface of the display housing through natural convection and heat radiation. Thus, as the amount of heat transferred to the display housing increases, the surface temperature of the display housing is raised. As a result, if user happens to touch the surface of the display housing when opening/closing the display housing or carrying the computer, he or she may feel discomfort or heat.

Further, according to the liquid cooling system, a heat radiating header inside the display housing is connected to a heat receiving header inside the housing through a circulating pipe. Thus, if a necessity of removing this display housing from the housing occurs to carry out maintenance on the interior of the display housing, the heat receiving header thermally connected to the MPU needs to be removed from the housing temporarily.

However, disassembly of the periphery of such a precision MPU not only leads to damage of the MPU but also may make inappropriate the positional relationship between the heat receiving header and the MPU upon installation of the heat receiving header. Thus, this is unfavorable in terms of maintaining reliability of thermal connection between the MPU and the heat receiving header.

If the MPU is loaded on a place difficult to access like a rear face of a circuit board, a troublesome work of disassembling the housing and taking out the circuit board is required. This work can be said to be inappropriate in viewpoint of operation efficiency and therefore, there is a room for improvement at this point.

BRIEF SUMMARY OF THE INVENTION

A first object of the present invention is to provide a cooling unit and an electronic apparatus capable of preventing a rise in temperature of the surface of a display unit.

A second object of the present invention is to provide an electronic apparatus, which allows a second housing to be removed from a first housing without releasing thermal connection between a heat receiving portion and a heat generating component and which can be disassembled/ reassembled easily and maintain reliability of heat conduction favorably.

In order to achieve the above-described first object, according to a first aspect of the present invention, there is provided a cooling unit for use in an electronic apparatus having a computer main body containing a heat generating component and a display unit supported by the computer main body, the cooling unit comprising: a heat receiving portion thermally connected to the heat generating component and accommodated in the computer main body; a heat exchanging portion installed on the display unit; circulating means for circulating cooling medium between the heat receiving portion and the heat exchanging portion, the circulating means having a pipe line for introducing cooling medium heated by the heat receiving portion to the heat exchanging portion; and intermediate cooling means installed in the pipe line, the intermediate cooling means forcing the heated cooling medium flowing from the heat receiving portion to the heat exchanging portion to be cooled.

Further, in order to achieve the above-described first object, according to a second aspect of the present invention, there is provided an electronic apparatus comprising: a housing containing a heat generating component; a display unit supported by the housing; a heat receiving portion accommodated in the housing and thermally connected to the heat generating component; a heat exchanging portion installed on the display unit; circulating means for circulating cooling medium between the heat receiving portion and the heat exchanging portion, the circulating means being disposed throughout the housing and the display unit and having a pipe line for introducing cooling medium heated by the heat receiving portion to the heat exchanging portion; and intermediate cooling means installed in the pipe line of the circulating means, the intermediate cooling means forcing the heated cooling medium flowing from the heat receiving portion to the heat exchanging portion to be cooled.

With such a structure, heat from the heat generating component is transferred to the cooling medium by means of the heat receiving portion. This heat is transmitted to the heat exchanging portion through a flow of the cooling medium. The cooling medium cooled by heat exchange by means of the heat exchanging portion is returned to the heat receiving portion and receives heat from the heat generating component again. By repeating such a cycle, heat from the heat generating component is transmitted to the display unit effectively and discharged to the atmosphere.

The cooling medium heated through heat conduction from the heat receiving portion is cooled via the intermediate cooling means before it reaches the heat exchanging portion. Thus, the temperature of the cooling medium introduced by the heat exchanging portion can be lowered. Thus, the rise in temperature of the surface of the display unit can be suppressed despite discharging heat from the heat generating component from the display unit, so that a bad influence upon user using the electronic apparatus can be reduced to such a level having no problem.

In order to achieve the above-described second object, according to a third aspect of the present invention, there is provided an electronic apparatus comprising: a first housing containing a heat generating component; a second housing, the second housing being journaled detachably on a rear end of the first housing through a hinge device having a hinge shaft extending in the width direction of the first housing and having a rear face which is directed backward of the first housing when the second housing is rotated to a posture in which it stands up from the rear end of the first housing; a heat receiving portion accommodated inside the first housing and thermally connected to the heat generating component; a heat exchanging portion installed on the second housing, the heat exchanging portion being capable of being taken out of the rear face; and circulating means for circulating the cooling medium between the heat receiving portion and the heat exchanging portion, the circulating means comprising a first pipe line for introducing cooling medium heated by the heat receiving portion to the heat exchanging portion and a second pipe line for introducing cooling medium cooled by heat exchange by means of the heat exchanging portion to the heat receiving portion, the first and second pipe lines being disposed throughout the inside of the first housing and the inside of the second housing via backward of the hinge shaft, the rear face of the second housing having at least an opening portion at a position corresponding to the first and second pipe lines, the opening portion being covered with a removable lid.

With such a structure, heat from the heat generating component is transferred to the cooling medium by means of the heat receiving portion. This heat is transferred to the heat exchanging portion through the cooling medium flowing through the first pipe line. The cooling medium cooled by heat exchange by the heat exchanging portion is returned to the heat receiving portion through the second pipe line and receives heat from the heat generating component again. By repeating such a cycle, heat from the heat generating component is transmitted effectively to the second housing and discharged thereof to the atmosphere.

In order to remove the second housing from the first housing, first, the lid covering the opening portion of the second housing is removed so as to expose the first and second pipe lines introduced to the interior of the second housing through the opening portion. Subsequently, the heat exchanging portion is taken out in the direction of the rear face of the second housing and the first and second pipe lines continuous to this heat exchanging portion are taken out of the opening portion. Consequently, with the first and second pipe lines connected to the heat exchanging portion, this heat exchanging portion can be taken out of the second housing. Finally, the hinge device is removed from the first housing so as to separate the second housing from the first housing.

In order to install the second housing onto the first housing, the second housing is installed onto the first housing through the hinge device. After that, the heat exchanging portion is installed on the second housing in the direction of the rear face of the second housing. Next, the first and second pipe lines continuous to the heat exchanging portion are inserted into the second housing through the opening portion and then this opening portion is covered with the lid. As a result, the first housing and the second housing are connected to each other and the installation of the heat exchanging portion onto the second housing is completed.

Consequently, when removing the second housing from the first housing, it is not necessary to release thermal connection between the heat receiving portion and the heat generating component. Thus, a troublesome work of disassembling or reassembling portions corresponding to the heat generating component and heat receiving portion is not required, so that the removal of the second housing is facilitated. Further, no unreasonable force is applied to the heat generating component or the positional relationship between the heat generating component and the heat receiving portion is not changed, thereby making it possible to maintain reliability of thermal connection between the both.

In order to achieve the above-described second object, according to a fourth aspect of the present invention, there is provided an electronic apparatus comprising: a housing accommodating a heat generating component and being capable of being opened upward; a display unit supported by the housing; a heat receiving portion accommodated in the housing and thermally connected to the heat generating component; a heat exchanging portion installed on the display unit; and circulating means for circulating cooling medium between the heat receiving portion and the heat exchanging portion, the circulating means comprising a first pipe line for introducing cooling medium heated by the heat receiving portion to the heat exchanging portion and a second pipe line for introducing cooling medium cooled by heat exchange by means of the heat exchanging portion to the heat receiving portion, the first and second pipe lines being disposed throughout the inside of the housing and the inside of the display unit and being divided to upstream portions and downstream portions inside the housing, the upstream portions and the downstream portions being connected detachably through a joint, the joint having closing means for closing the first and second pipe lines when the first and second pipe lines are divided to the upstream portions and the downstream portions.

With such a structure, heat from the heat generating component is transferred to cooling medium by the heat receiving portion. This heat is transmitted to the heat exchanging portion through the cooling medium flowing through the first pipe line. Cooling medium cooled by heat exchange by means of the heat exchanging portion is returned to the heat receiving portion through the second pipe line and receives heat from the heat generating component again. By repeating such a cycle, heat from the heat generating component is transmitted to the second housing effectively and discharge thereof to the atmosphere.

In order to remove the second housing from the first housing, the first housing is opened upward so as to expose the first and second pipe lines introduced to the interior of the first housing. Next, the first and second pipe lines extending throughout the heat receiving portion and the heat exchanging portion are divided inside the first housing. Consequently, when removing the second housing having the heat exchanging portion from the first housing, the first and second pipe lines make no obstacle and the thermal connection between the heat receiving portion and the heat generating component does not have to be released. As a result, a troublesome work of disassembling/reassembling portions corresponding to the heat generating component and heat receiving portion is not required, so that the removal of the second housing is facilitated. Further, no unreasonable force is applied to the heat generating component or the positional relationship between the heat generating component and the heat receiving portion is not changed, so that reliability of thermal connection between the both can be maintained.

Further, if the upstream portions and the downstream portions of the first and second pipe lines are separated from each other, the first and second pipe lines are automatically closed. Therefore, no cooling medium leaks from the first and second pipe lines and thus, no special work for sealing the first and second pipe lines is required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

DETAILED DESCRIPTION OF THE INVENTION

Hereinafter, the first embodiment of the present invention applied to a portable computer will be described with reference to FIGS. 1 to 13.

Figure 1:
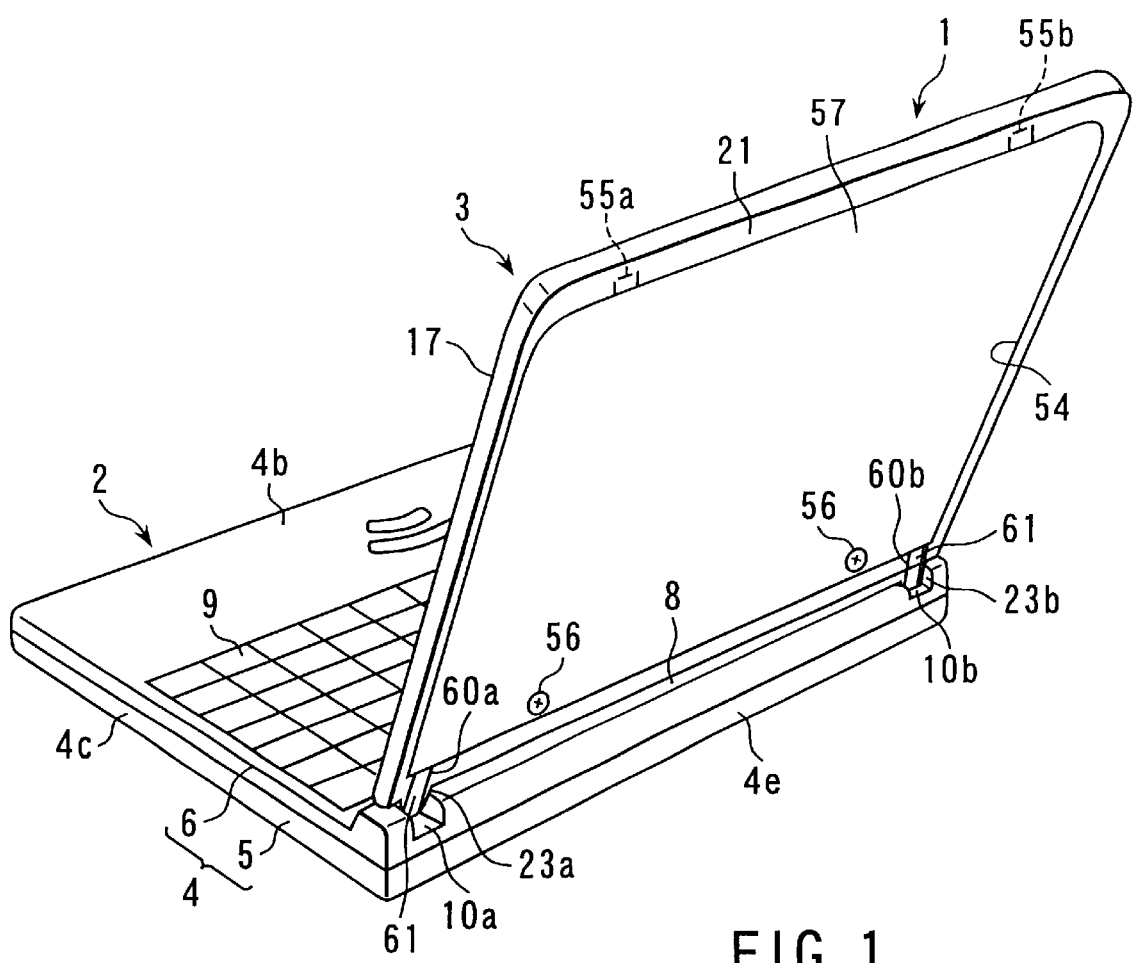
FIG. 1 is a perspective view of a portable computer according to a first embodiment of the present invention.
Figure 2:
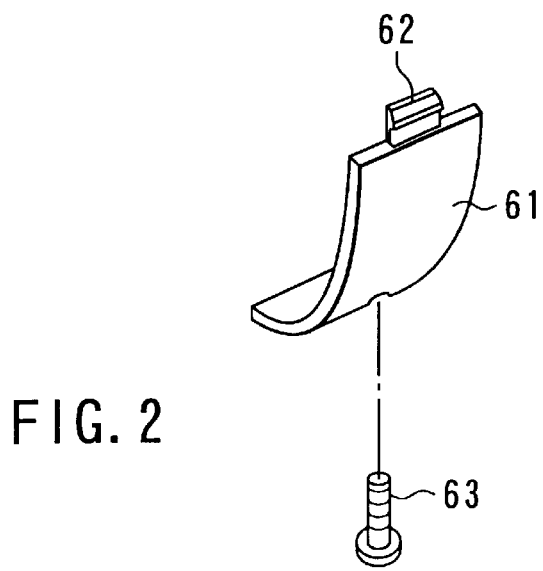
FIG. 2 is a perspective view of a lid for covering an opening portion in a display housing according to the first embodiment of the present invention.
Figure 3:
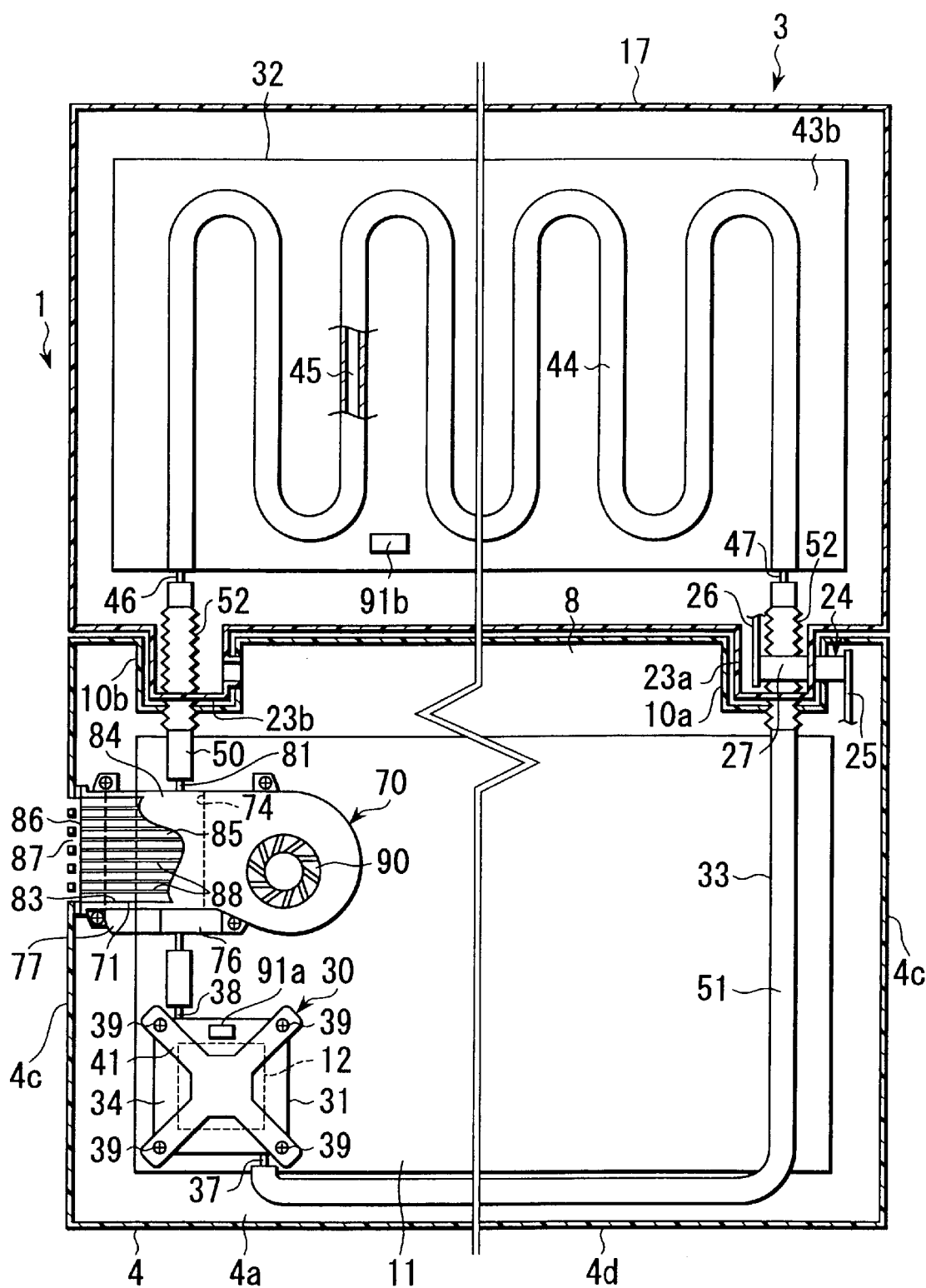
FIG. 3 is a sectional view of the portable computer having a liquid-cooling type cooling unit according to the first embodiment of the present invention.

FIGS. 1 and 3 show a portable computer 1 which is an electronic apparatus mentioned in this specification. The portable computer 1 comprises a computer main body 2 and a display unit 3, which is supported by this computer main body 2.

The computer main body 2 has a first housing 4 of synthetic resin. The first housing 4 is a flat box comprising a bottom wall 4a, an upper wall 4b, right/left side walls 4c, a front wall 4d and a rear wall 4e. The first housing 4 is composed of a base 5 having the bottom wall 4a and a top cover 6 having the upper wall 4b. The top cover 6 is installed detachably to the base 5. Thus, by removing the top cover 6 from the base 5, the first housing 4 is opened upward.

A hallow convex portion 8 protruded upward is formed at a rear end portion of the upper wall 4b of the first housing 4. The convex portion 8 is extended in the width direction of the first housing 4 behind a keyboard 9. The convex portion 8 has display supporting portions 10a and 10b on both ends thereof. The display supporting portions 10a and 10b are constructed in the form of a dent open continuously forward, upward and backward of the convex portion 8. The bottom of each of the display supporting portions 10a and 10b is located downward of the upper wall 4b as shown in FIG. 4.

Figure 4:
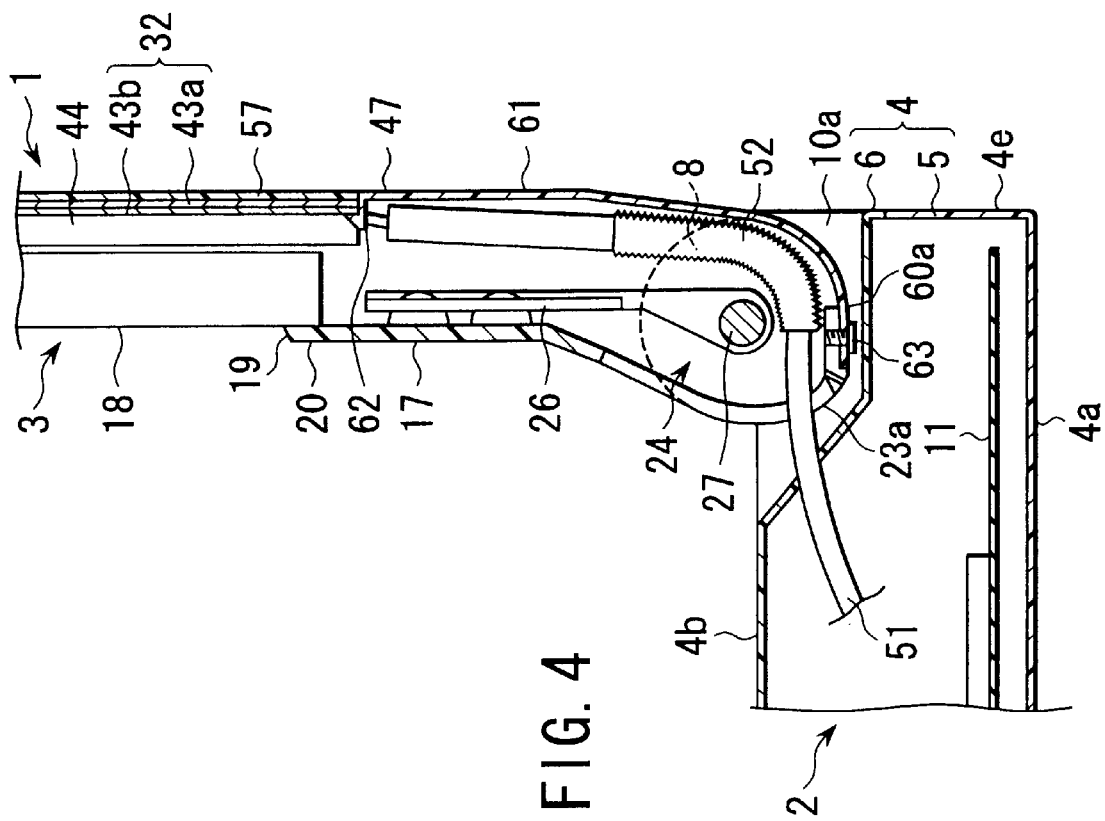
FIG. 4 is a sectional view of the portable computer indicating a second pipe line insertion path when the display unit is rotated to its opening position in the first embodiment of the present invention.

As shown in FIGS. 3 and 4, a circuit board 11 is accommodated inside the first housing 4. The circuit board 11 is disposed in parallel to the bottom wall 4a of the first housing 4. A semiconductor package 12 is installed at a left end portion of the top face of the circuit board 11 as a heat generating component.

Figure 8:
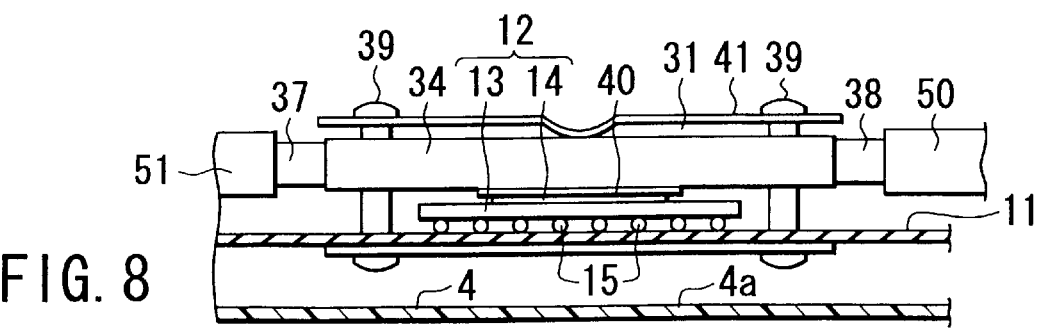
FIG. 8 is a sectional view showing a positional relationship between a heat receiving head and a semiconductor package in the first embodiment of the present invention.

The semiconductor package 12 composes a micro processing unit (MPU), which serves as the center of the portable computer 1. As shown in FIG. 8, the semiconductor package 12 includes a rectangular base substrate 13 and an IC chip 14 soldered on the top face of this base substrate 13. The base substrate 13 is soldered to the top face of the circuit board 11 through plural soldering balls 15. In this kind of the semiconductor package 12, its power consumption during operation has been increased accompanied by currently intensified processing speed and multiple functions, so that heat generation from the IC chip 14 has become so large that cooling of the chip is required.

As shown in FIGS. 1 and 3, the display unit 3 comprises a display housing 17 serving as a second housing and a liquid crystal display panel 18 accommodated in this display housing 17. The display housing 17 is composed of, for example, synthetic resin material and constructed in the form of a thin flat box having a front face 20 in which an opening portion 19 is formed and a rear face 21 opposing this front face 20. The liquid crystal display panel 18 has a display screen (not shown) for displaying information such as characters and pictures. This display screen is exposed out of the display housing 17 through the opening portion 19.

The display housing 17 has a pair of leg portions 23a and 23b protruded from an end portion thereof. The leg portions 23a and 23b are hallow and apart from each other in the width direction of the display housing 17. The leg portions 23a and 23b are introduced to the display supporting portions 10a and 10b in the first housing 4.

Figure 5:
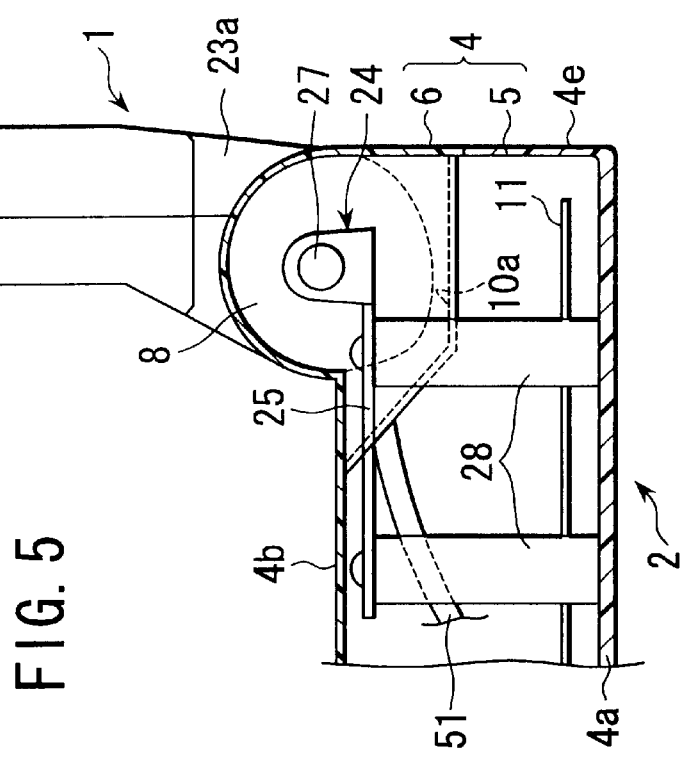
FIG. 5 is a sectional view of the portable computer indicating a joint structure between the computer main body and the display unit according to the first embodiment of the present invention.

The right leg portion 23a is supported by the first housing 4 via a hinge device 24. The hinge device 24 comprises a first bracket 25, a second bracket 26 and a hinge shaft 27. As shown in FIG. 5, the first bracket 25 is screwed to a top end of plural boss portions 28 extended upward from the bottom wall 4a. A rear end portion of the first bracket 25 is introduced to inside of the convex portion 8 on the right side of the display supporting portion 10a. As shown in FIG. 4, the second bracket 26 is screwed to an inside face at the right end of the front face 20 of the display housing 17. An end portion of the second bracket 26 is introduced into inside of the right leg portion 23a. The hinge shaft 27 is stretched between the rear end portion of the first bracket 23a and the end portion of the second bracket 26 such that it passes through a side face of the leg portion 23a and a side face of the display supporting portion 10a. For the reason, the hinge shaft 27 is disposed horizontally along the width direction of the first housing 4 and the display housing 17.

An end portion of the hinge shaft 27 is rotatably coupled with the rear end portion of the first bracket 25. The other end portion of the hinge shaft 27 is fixed to the end portion of the second bracket 26. A friction type brake mechanism (not shown) employing, for example, a wave washer is built in a joint portion between the hinge shaft 27 and the first bracket 25. This brake mechanism limits a free rotation of the hinge shaft 27.

Thus, the display unit 3 is rotatable around the hinge shaft 27. If speaking more in detail, the display unit 3 is supported on the first housing 4 rotatably with respect to the hinge shaft 27 from a closing position in which the same display unit 3 is tilted down so as to cover the key board 9 to an opening position in which it is raised so as to expose the key board 9 and the display screen. When the display unit 3 is turned to the opening position, the rear face 21 of the display housing 17 is directed rearward of the portable computer 1.

As shown in FIG. 3, the portable computer 1 incorporates a liquid cooling-type cooling unit 30 for forcing the semi-conductor package 12 to be cooled. The cooling unit 30 comprises a heat receiving head 31 as a heat receiving portion, a heat radiator 32 as a heat exchanging portion and a circulation path 33 as circulating means.

Figure 9:
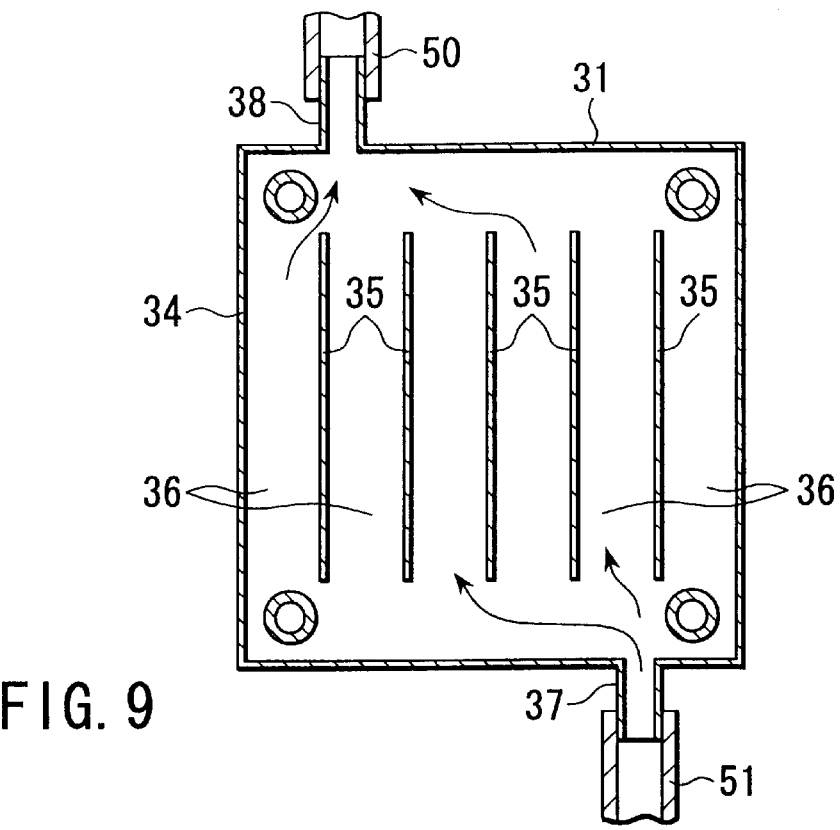
FIG. 9 is a sectional view of the heat receiving head indicating the structure of inside of a heat transmitting case in the first embodiment of the present invention.

As shown in FIGS. 8 and 9, the heat receiving head 31 is accommodated in the first housing 4. This heat receiving head 31 has a heat transmitting case 34. The heat transmitting case 34 is composed of metal material having an excellent thermal conductivity like aluminum alloy. This heat transmitting case 34 is constructed in the form of a thin flat box having a plane larger than the semiconductor package 12.

The heat transmitting case 34 contains plural guide walls 35 inside. The guide walls 35 are disposed in parallel to each other with an interval between one and another, so that the inside of the heat transmitting case 34 is divided to plural refrigerant flow paths 36. The heat transmitting case 34 has a refrigerant intake 37 and a refrigerant outlet 38. The refrigerant intake 37 is located at an upstream end of the refrigerant flow paths 36. The refrigerant outlet 38 is located at a downstream end of the refrigerant flow paths 36.

The heat transmitting case 34 is supported on the top face of the circuit board 11 via its four corner portions with screws 39. This heat transmitting case 34 opposes the circuit board 11 across the semi-conductor package 12. A heat transmitting sheet 40 is disposed between the central portion on the bottom face of the heat transmitting case 34 and the IC chip 14 of the semiconductor package 12. The heat transmitting case 34 is pressed against the IC chip 14 through a leaf spring 41 so that the heat transmitting sheet 40 is sandwiched between the heat transmitting case 34 and the IC chip 14. Thus, the heat transmitting case 34 is thermally in contact with the IC chip 14 through the heat transmitting sheet 40.

As shown in FIGS. 3 and 4, the heat radiator 32 is accommodated inside the display housing 17. The heat radiator 32 has the first and second heat radiating plates 43a and 43b. The first and second heat radiating plates 43a and 43b are composed of metal material having an excellent thermal conductivity like for example aluminum alloy and have substantially the same size as the liquid crystal display panel 18.

Figure 10:
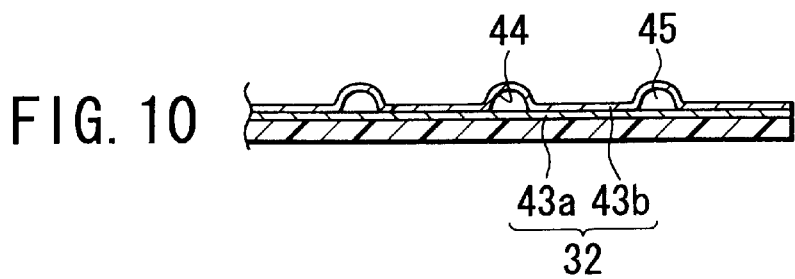
FIG. 10 is a sectional view of a heat radiator for use in the first embodiment of the present invention.

As shown in FIG. 10, the first heat radiating plate 43a and the second heat radiating plate 43b are overlaid over each other. The second heat radiating plate 43b has a concave portion 44, which is open to a matching face with the first heat radiating plate 43a. The concave portion 44 is formed meanderingly on substantially entire surface of the second heat radiating plate 43b. The concave portion 44 forms a radiated heat path 45 with the matching face with the first heat radiating plate 43a. The radiated heat path 45 has a refrigerant intake 46 and a refrigerant outlet 47. The refrigerant intake 46 is open to the left leg portion 23b inside the display housing 17. The refrigerant outlet 47 is open to the right leg portion 23a inside the display housing 17. Thus, the refrigerant intake 46 and the refrigerant outlet 47 are apart from each other in the width direction of the display housing 17.

The aforementioned circulation path 33 has a first pipe line 50 and a second pipe line 51. The first and second pipe lines 50 and 51 are composed of metallic pipe of, for example, stainless.

The first pipe line 50 connects the refrigerant outlet 38 of the heat receiving head 31 to the refrigerant intake 46 of the heat radiator 32. The first pipe line 50 is extended toward the display supporting portion 10b on the left inside the first housing 4. After a front end of this first pipe line 50 passes through a front face of the display supporting portion 10b and a front face of the leg portion 23b on the left, it is introduced into the display housing 17.

The second pipe line 51 connects the refrigerant intake 37 of the heat receiving head 31 to the refrigerant outlet 47 of the heat radiator 32. After the second pipe line 51 is introduced to the right side along the front wall 4d inside the first housing 4, it is extended toward the display supporting portion 10a on the right. After a front end of the second pipe line 51 passes through a front face of the display supporting portion 10a and a front face of the leg portion 23a on the right, it is introduced to the leg portion 23b and then introduced into the display housing 17.

Therefore, the refrigerant flow paths 36 of the heat receiving head 31 is connected to the radiated heat path 45 of the heat radiator 32 through the first and second pipe lines 50 and 51. The refrigerant flow path 36, the radiated heat path 45 and the first/second pipe lines 50 and 51 are filled with liquid-like cooling medium like water or fluorocarbon.

As shown in FIGS. 3 and 5, of the first and second pipe lines 50 and 51, portions passing through the leg portions 23a and 23b of the display housing 17 are composed of an expandable bellows pipe 52 having a flexibility. The bellows pipes 52 are curved in the form of a circle around the hinge shaft 27 and disposed behind this hinge shaft 27.

Thus, the bellows pipes 52 of the first and second pipe lines 50 and 51 are deformable freely in a direction around the hinge shaft 27. Consequently, the first and second pipe lines 50 and 51 are deformed smoothly following a rotation of the display unit 3 when it is rotated from its closing position to its opening position, so as to absorb a curve applied to the first and second pipe lines 50 and 51 when the display unit 3 is rotated.

As shown in FIG. 1, the display housing 17 has a mounting port 54, which is open in the rear face 21 thereof. The mounting port 54 is located behind the liquid crystal display panel 18 and has a size fitting to the heat radiator 32. The first heat radiating plate 43a of the heat radiator 32 has a lower edge portion adjacent the leg portions 23a and 23b of the display housing 17 and an upper edge portion located on an opposite side to this lower edge portion. A pair of fitting pawls 55a and 55b are formed on the upper edge portion of the first heat radiating plate 43a. These fitting pawls 55a and 55b are apart from each other in the width direction of the display housing 17.

The heat radiator 32 is fit to the mounting port 54 from the rear face 21 of the display housing 17. Consequently, the fitting pawls 55a and 55b of the heat radiator 32 are hooked on the opening edge portion of the mounting port 54 detachably. Further, the first and second heat radiating plates 43a and 43b are fixed to an inside face of the display housing 17 through two positions on the lower edge portion with screws 56. Thus, the heat radiator 32 is maintained such that it is in contact with the inside face of the display housing 17 so that it is thermally connected to the display housing 17.

As shown in FIG. 4, an opposite surface to the second heat radiating plate 43b of the first heat radiating plate 43a of the heat radiator 32 is covered with protective layer 57. The protective layer 57 is composed of synthetic resin having lower thermal conductivity than the first and second heat radiating plates 43a and 43b. This protective layer 57 is exposed out of the display housing 17 through the mounting port 54 when the heat radiator 32 is fixed to the display housing 17 and further, located on the same plane as the rear face 21 of the display housing 17.

As shown in FIG. 1, the rear face 21 of the display housing 17 has a pair of opening portions 60a and 60b at positions corresponding to the leg portions 23a and 23b. The opening portions 60a and 60b oppose the bellows pipes 52 in the first and second pipe lines 50 and 51. Ends of the opening portions 60a and 60b reach the front ends of the leg portions 23a and 23b while the other ends of the opening portions 60a and 60b are continuous to the mounting port 54. Thus, the opening portions 60a and 60b are large enough to take out the bellows pipes 52.

The opening portions 60a and 60b are covered with lids 61 of synthetic resin which can be removed. The lids 61 are fit to the opening portions 60a and 60b so that the fitting pawl 62 of each end thereof is hooked on the aforementioned heat radiator 32. The other ends of the lids 61 are fixed to the front ends of the leg portions 23a and 23b through a screw 63.

Figure 7:
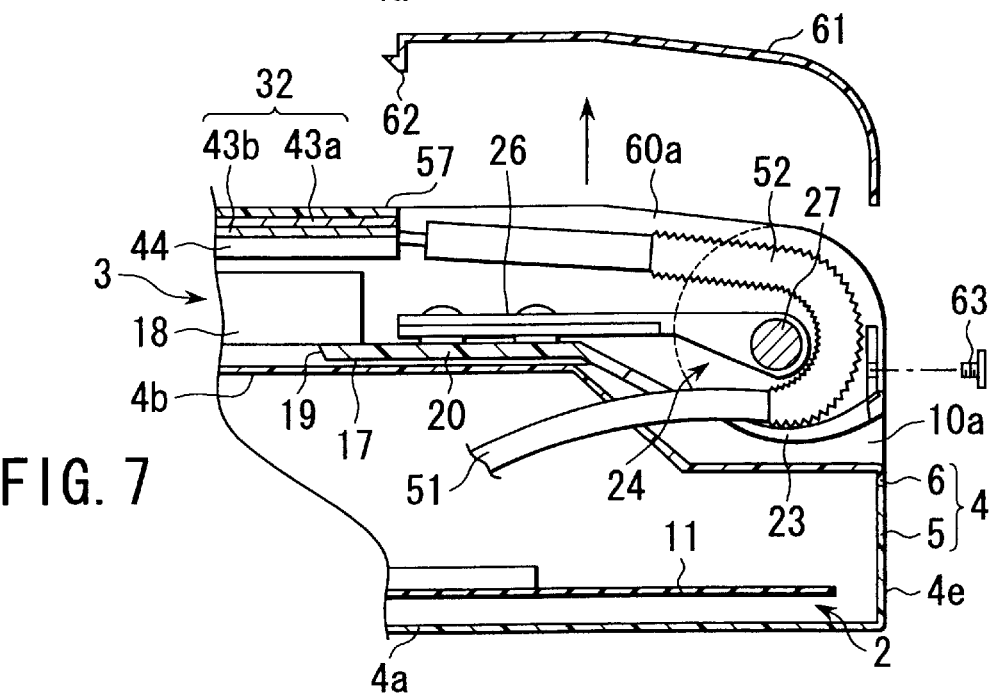
FIG. 7 is a sectional view of the portable computer indicating a state in which the lid thereof is removed from the display housing in the first embodiment of the present invention.

Thus, if engagement between the fitting pawl 62 and the heat radiator 32 is released by removing the screw 63 as shown in FIG. 7, the lids 61 can be removed from the display housing 17 so as to open the opening portions 60a and 60b. As a result, the bellows pipes 52 inserted inside the leg portions 23a and 23b are exposed toward the rear face 21 of the display housing 17 through the opening portions 60a and 60b.

Figure 11:
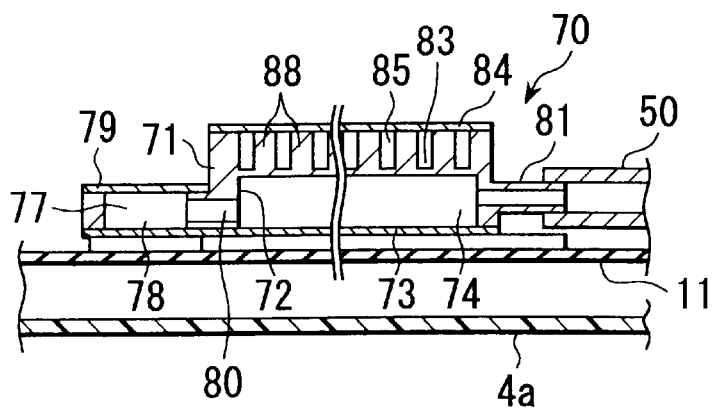
FIG. 11 is a sectional view of an intermediate cooling unit indicating the positional relationship between a refrigerant path and a cooling air path in the first embodiment of the present invention.

As shown in FIGS. 3, 11, the aforementioned cooling unit 30 is equipped with an intermediate cooling unit 70 as intermediate cooling means. The intermediate cooling unit 70 is located halfway of the first pipe line 50 and accommodated inside the first housing 4. The intermediate cooling unit 70 comprises a main body 71 and an electric fan 90.

The main body 71 is composed of metallic material having an excellent thermal conductivity like for example, aluminum alloy and screwed to a top face on the left end portion of the circuit board 11. The main body 71 has a first concave portion 72, which is open downward. The opening end of the first concave portion 72 is sealed with a bottom plate 73. The bottom plate 73 forms a refrigerant path 74 in cooperation with the first concave portion 72 and this refrigerant path 74 is extended in the depth direction of the first housing 4.

A pump 76 and an accumulator 77 are built in the main body 71 of the intermediate cooling unit 70 integratedly. A suction end of the pump 76 is continuous to the refrigerant outlet 38 of the heat receiving head 31 through an upstream portion of the first pipe line 50. A discharge end of the pump 76 is continuous to the refrigerant path 74 through the accumulator 77. This pump 76 is driven at the same time when the portable computer 1 is powered on and then pressurizes cooling medium and supplies to the accumulator 77.

As shown in FIG. 11, the accumulator 77 has a pressure accumulating chamber 78 for accumulating cooling medium discharged from the pump 76. The pressure accumulating chamber 78 is formed on a side portion of the main body 71. Part of the peripheral wall of this pressure accumulating chamber 78 is constructed of diaphragm 79 elastically deformable. If cooling medium discharged from the pump 76 is supplied to the pressure accumulating chamber 78, the diaphragm 79 is elastically deformed corresponding to a discharging pressure of the cooling medium so that the capacity of the pressure accumulating chamber 78 is changed. As a result, pulsation of the cooling medium accompanied by driving of the pump 76 is absorbed so as to adjust the discharging pressure of the cooling medium to a constant level. This cooling medium is supplied to the refrigerant path 74 through a communicating port 80 formed in the main body 71. The refrigerant path 74 communicates with a refrigerant outlet 81 formed in the main body 71. The refrigerant outlet 81 is connected to the refrigerant intake 46 of the heat radiator 32 through a downstream portion of the first pipe line 50.

Therefore, cooling medium supplied to the refrigerant path 74 in the intermediate cooling unit 70 from the pump 76 is introduced to the heat radiator 32 through the downstream portion of the first pipe line 50. After this cooling medium flows through the radiated heat path 45 in the heat radiator 32, it is introduced to the heat receiving head 31 through the second pipe line 51 and from here, it is returned to an absorption end of the pump 76 through the upperstream portion of the first pipe line 50. Thus, the cooling medium is forced to circulate between the heat receiving head 31 and the heat radiator 32.

As shown in FIG. 11, the main body 71 has a second concave portion 83, which is open upward. The opening end of the second concave portion 83 is sealed with a head plate 84. The head plate 84 forms a cooling air path 85 in cooperation with the second concave portion 83. The cooling air path 85 adjoins the refrigerant path 74 beyond the main body 71 and is thermally connected to this refrigerant path 74. The cooling air path 85 is extended in the width direction of the first housing 4. This cooling air path 85 has a cooling air outlet 86. The cooling air outlet 86 opposes an exhaust port 87, which is open in the side wall 4c on the left side of the first housing 4.

The main body 71 has a plurality of heat radiating fins 88 protruded from a bottom of the second concave portion 83. These heat radiating fins 88 face the cooling air path 85 such that they are extended linearly along the cooling air path 85.

As shown in FIG. 3, the aforementioned electric fan 90 is built in the main body 71 integratedly. The electric fan 90 is located on an opposite side to the cooling air outlet 86 of the cooling air path 85 so as to feed cooling air through the cooling air path 85. According to this embodiment, the electric fan 90 is driven when the temperature of the semiconductor package 12 and the temperature of the display housing 17 arrive at respective predetermined values. Thus, the heat receiving head 31 thermally connected to the semiconductor package 12 and the heat radiator 32 are equipped with temperature sensors 91a and 91b respectively. The electric fan 90 is driven according to temperature signals from the temperature sensors 91a and 91b.

Next, a cooling operation of the semiconductor package 12 will be described with reference to FIG. 12.

Figure 12:
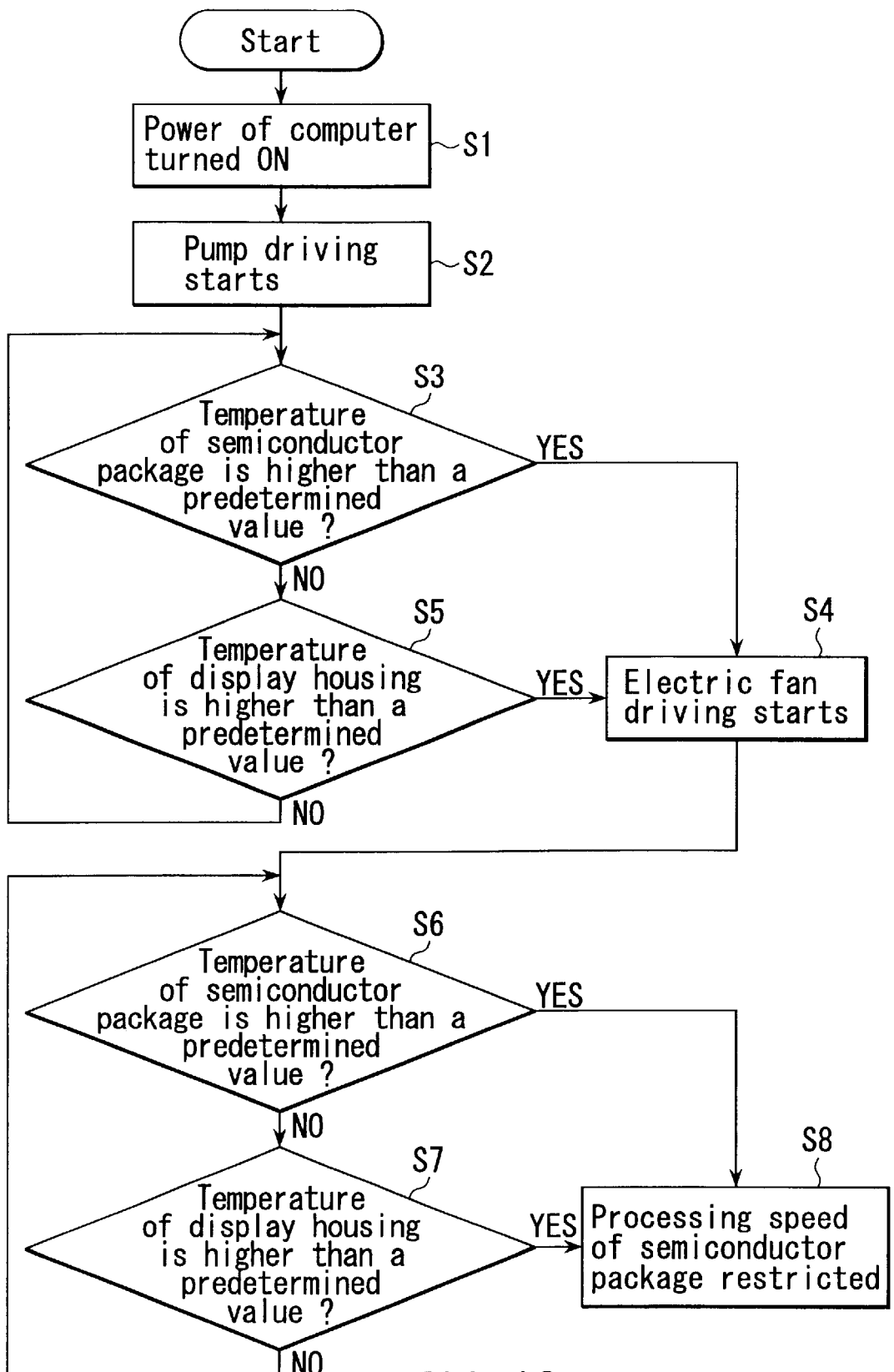
FIG. 12 is a flow chart showing electric fan control system of the first embodiment of the present invention.

As shown in FIG. 12, power of the portable computer 1 is turned on in step S1. Consequently, in step S2, the pump 76 of the cooling unit 30 is driven so that circulation of the cooling medium between the heat receiving head 31 and the heat radiator 32 is started.

If the IC chip 14 of the semiconductor package 12 is heated during an operation of the portable computer 1, heat of the IC chip 14 is transmitted to the heat transmitting case 34 of the heat receiving head 31. Heat of the IC chip 14 transmitted to the heat transmitting case 34 is transferred to cooling medium flowing through the refrigerant flow paths 36. After heat exchange at the heat receiving head 31, heated cooling medium is introduced to the heat radiator 32 through the upstream portion of the first pipe line 50, the refrigerant path 74 in the intermediate cooling unit 70 and the downstream portion of the first pipe line 50. Thus, heat of the IC chip 14 is transferred to the heat radiator 32 through a flow of the cooling medium.

The cooling medium introduced to the heat radiator 32 flows through the meandering radiated heat path 45. In this flow process, heat absorbed in the cooling medium is transmitted to the first and second heat radiating plates 43a and 43b. Part of heat transmitted to the first and second heat radiating plates 43a and 43b is diffused by heat transfer to the display housing 17 so that it is discharged into the atmosphere from the surface of the display housing 17.

The protective layer 57 covering the first heat radiating plate 43a is exposed out of the display housing 17 through the mounting port 54 in the rear face 21 of the display housing 17. Therefore, most of heat transmitted to the first heat radiating plate 43a is discharged into the atmosphere from the surface of the protective layer 57.

Cooling medium cooled by heat exchange by means of the heat radiator 32 is returned to the absorbing end of the pump 76 through the second pipe line 52. After this cooling medium is pressurized by the pump 76, it is supplied to the refrigerant flow paths 36 of the heat receiving head 31 through the accumulator 77.

While the portable computer 1 remains powered on, the temperatures of the semiconductor package 12 and the display housing 17 are monitored by the temperature sensors 91a and 91b. Thus, as long as the portable computer 1 is powered on, in step S3, the temperature of the semiconductor package 12 is being checked.. When the temperature of this semiconductor package 12 reaches a predetermined level, the processing proceeds to step S4, in which the electric fan 90 of the intermediate cooling unit 70 is started.

If the electric fan 90 is driven, air inside the first housing 4 is turned to cooling air and then fed to the cooling air path 85. Because the cooling air path 85 is thermally connected to the refrigerant path 74, part of heat in the cooling medium flowing through this refrigerant path 74 is taken away by flow of cooling air flowing through the cooling air path 85 and discharged out of the first housing 4 through the exhaust port 87. Thus, the cooling medium heated by the heat receiving head 31 is cooled before it reaches the heat radiator 32, thereby the temperature of the cooling medium fed to the heat radiator 32 being kept low.

Unless the temperature of the semiconductor package 12 checked in step S3 reaches the predetermined value, the processing proceeds to step S5, in which the temperature of the display housing 17 is checked. Because the pump 76 of the intermediate cooling unit 70 continues to be driven as long as the portable computer 1 remains powered on, the cooling medium continues to transfer heat of the semiconductor package 12 to the display housing 17. Thus, even if the temperature of the semiconductor package 12 does not reach the predetermined value, when the temperature of the display housing 17 reaches the predetermined value, the processing proceeds to step S4, in which the electric fan 90 is started.

Consequently, part of heat in the cooling medium flowing through the refrigerant path 74 is taken away by a flow of cooling air flowing through the cooling air path 85. As a result, the temperature of cooling medium fed to the heat radiator 32 drops, so that the amount of heat transferred from the heat radiator 32 to the display housing 17 decreases.

After the driving of the electric fan 90 is started also, the temperatures of the semiconductor package 12 and the display housing 17 continue to be checked in steps S6, S7. Here, if it is determined that the temperatures of the semiconductor package 12 and the display housing 17 are over the predetermined value, the processing proceeds to step S8. In step S8, processing speed of the semiconductor package 12 is reduced temporarily so as to reduce power consumption of the semiconductor package 12 thereby suppressing generation of heat in the IC chip 14.

According to such a portable computer 1, cooling medium is forced to circulate between the heat receiving head 31 and the heat radiator 32 so as to transfer heat of the semiconductor package 12 to the display housing 17 effectively and discharge it into the atmosphere. Therefore, as compared to the conventional ordinary forced air cooling system, heat radiation of the semiconductor package 12 can be raised thereby making it possible to correspond to increase of generation of heat reasonably.

Further, according to the above-described structure, the cooling medium heated by the heat receiving head 31 is cooled through the intermediate cooling unit 70 before it reaches the heat radiator 32. Thus, the temperature of the cooling medium fed to the heat radiator 32 can be lowered so that a rise of the surface temperature of the display housing 17 receiving heat of the heat radiator 32 can be suppressed. Thus, if an operator touch the surface of the display housing 17 with his hand when for example, adjusting the standing angle of the display unit 3 or carrying the portable computer 1, he never feels a sudden of heat, thereby making it possible to lower a thermal influence of the portable computer 1 upon the human body during use.

At the same time when the portable computer 1 is powered on, circulation of cooling medium is started so as to transfer heat of the semiconductor package 12 to the heat radiator 32. Thus, at the time of low/medium load in which the temperature of the semiconductor package 12 is not raised so much, it is possible to stop operation of the electric fan 90 or suppress the rotation speed, thereby enabling a silent operation.

Further, because the pump 76 and the accumulator 77 are built in the main body 71 of the intermediate cooling unit 70, a structure containing a movable portion can be handled as a single unit. Thus, incorporation of the cooling unit 30 into the first housing 4 can be facilitated, thereby improving operation efficiency of assembly of the portable computer 1.

Additionally, the first pipe line 50 for introducing cooling medium heated by the heat receiving head 31 to the heat radiator 32 and the second pipe line 51 for returning cooling medium cooled by the heat radiator 32 to the heat receiving head 31 are disposed on the left and right leg portions 23a and 23b of the display housing 17. Thus, at portions where the first and second pipe lines 50 and 51 are stretched between the first housing 4 and the display housing 17, these first and second pipe lines 50 and 51 can be kept apart from each other so as to separate them thermally. Thus, it is possible to prevent an undesired heat exchange between the first pipe line 50 and the second pipe line 51, thereby raising heat transfer efficiency from the heat receiving head 31 to the heat radiator 32.

On the other hand, a procedure for removing the display unit 3 from the first housing 4 in the portable computer 1 having the above-described structure will be described.

Figure 6:
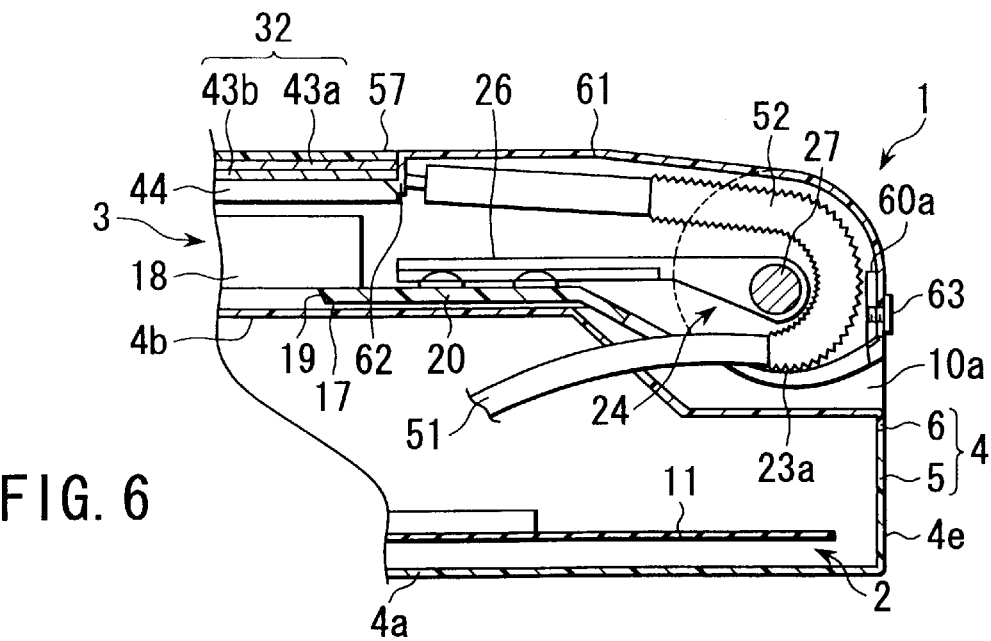
FIG. 6 is a sectional view of the portable computer indicating the second pipe line insertion path when the display unit is rotated to its closing position in the first embodiment of the present invention.

First, as shown in FIG. 6, the display unit 3 is rotated to the closing position, so that the screws 63 which fix the lids 61 are exposed rearward of the display supporting portions 10a and 10b. Next, the screws 63 are loosened so as to release fixing of the lids 61 with these screws 63. After that, engagement between the fitting pawl 62 and the heat radiator 32 is released and the lids 61 are removed from the display housing 17. Consequently, as shown in FIG. 7, the opening portions 60a and 60b are opened so that the bellows pipes 52 inserted inside the leg portions 23a and 23b are exposed toward the rear face 21 of the display housing 17 through the opening portions 60a and 60b.

Next, the screws 56 which fix the first and second heat radiating plates 43a and 43b to the display housing 17 are loosened so as to release engagement between the heat radiator 32 and the display housing 17. Subsequently, the fitting pawls 55a and 55b of the heat radiator 32 are separated from the opening edge portion of the mounting port 54 and then, this heat radiator 32 is taken out in the direction of the rear face 21 of the display housing 17 through the mounting port 54. This procedure for taking out this heat radiator 32 can be carried out irrespective of whether the display unit 3 is rotated to its closing position or the opening position.

Because the opening portions 60a and 60b are continuous to the mounting port 54, the first and second pipe lines 50 and 51 continuous to this heat radiator 32 are pulled out of the opening portions 60a and 60b rearward of the leg portions 23a and 23b at the same time when the heat radiator 32 is taken out of the mounting port 54. Because at this time, the second pipe line 51 is disposed behind the hinge shaft 27, the hinge shaft 27 never becomes an obstacle when taking the second pipe 51 out of the leg portion 23a.

Figure 13:
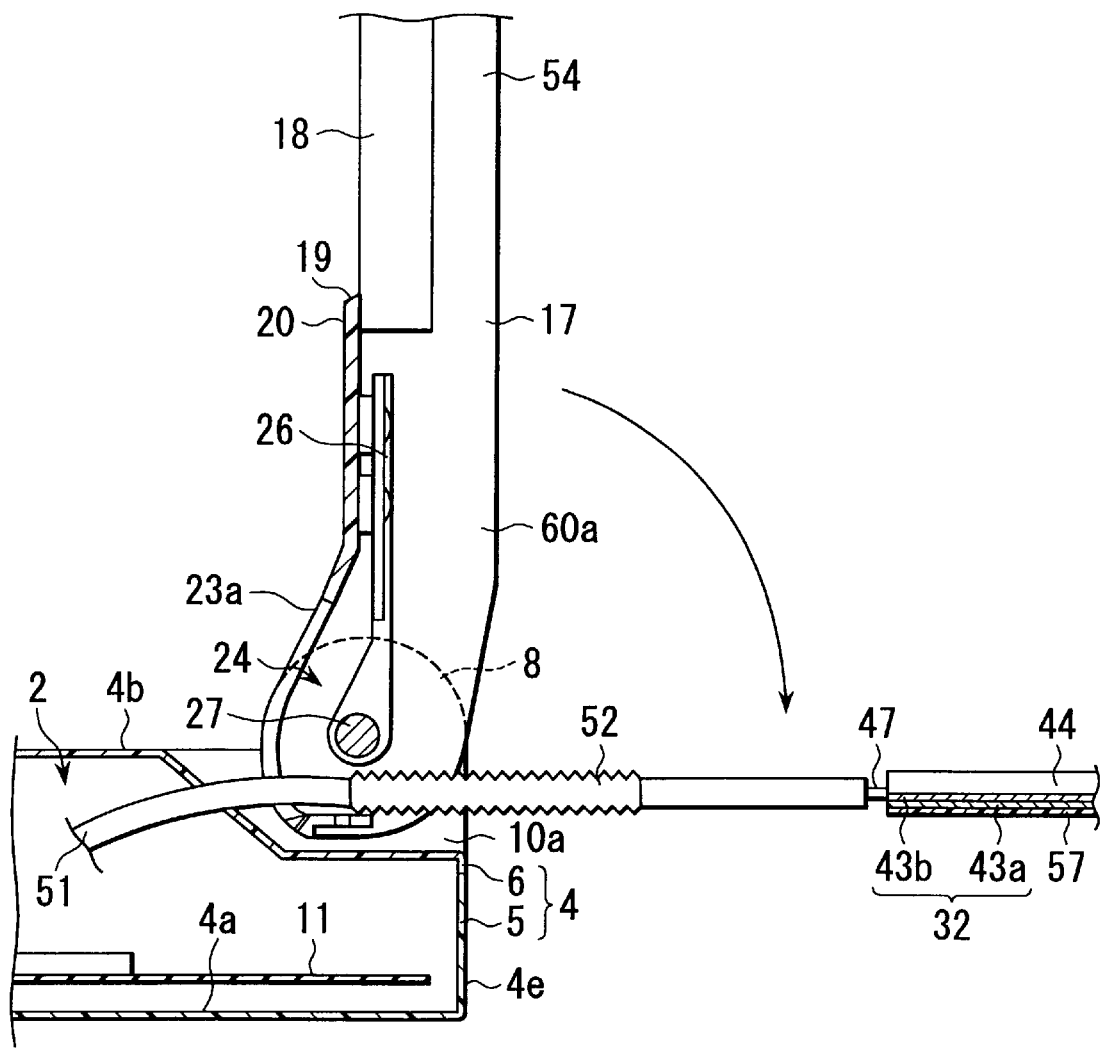
FIG. 13 is a sectional view of the portable computer indicating a state in which the heat radiator is removed form the display housing in the first embodiment of the present invention.

Thus, with the first and second pipe lines 50 and 51 connected to the heat radiator 32 as shown in FIG. 13, the heat radiator 32 can be pulled out rearward of the display housing 17.

Next, by taking the top cover 6 of the first housing 4 out of the base 5, the first bracket 25 of the hinge device 24 fixed to this base 5 is exposed. Finally, the fixing between the first bracket 25 and the boss portion 28 with the screws is released and the display unit 3 is taken out upward of the base 5 together with the hinge device 24. Thus, the display unit 3 and the computer main body 2 can be separated from each other.

When mounting the display unit 3 onto the computer main body 2, the first bracket 25 of the hinge device 24 is screwed to the boss portion 28 of the base 5 before the top cover 6 is mounted on the base 5. After that, the top cover 6 is mounted on the base 5 so as to cover the first bracket 25 with this top cover 6.

Next, the heat radiator 32 is fitted with the mounting port 54 in the rear face 21 of the display housing 17, so that the fitting pawls 55a and 55b of the first heat radiating plate 43a are hooked on the opening edge portion of the mounting port 54. Further, the lower edge portions of the first and second heat radiating plates 43a and 43b are fixed to the display housing 17 with the screws 56. Subsequently, the first and second pipe lines 50 and 51 continuous to the heat radiator 32 are inserted inside the leg portions 23a and 23b through the opening portions 60a and 60b.

Finally, the lids 61 are fitted with the opening portions 60a and 60b and these lids 61 are fixed to the leg portions 23a and 23b with the screws 63. Consequently, the computer main body 2 and the display unit 3 are coupled with each other rotatably, so that the incorporation of the heat radiator 32 in the display housing 17 is completed.

With such a structure, the heat radiator 32 accommodated in the display housing 17 can be taken out of the rear face 21 of the display housing 17 together with the first and second pipe lines 50 and 51. Thus, with the heat radiator 32 taken out of the display housing 17, the display unit 3 can be taken out of the first housing 4 or installed to the first housing 4.

Therefore, when attaching/detaching the display unit 3 to/from the first housing 4, it is not necessary to release thermal connection between the heat receiving head 31 and the semiconductor package 12 or thermally connect again, so that the procedure for disassembly/assembly of the thermally connecting portion between the heat receiving head 31 and the semiconductor package 12 is not required.

Thus, no unreasonable force is applied to the precision semiconductor package 12 or the positional relationship between the semiconductor package 12 and the heat receiving head 31 is not changed, so that reliability of heat conduction can be maintained favorably.

Further, the bellows pipe 52 in the second pipe line 51 is disposed behind the hinge shaft 27 inside the leg portion 23a. Thus, the curvature of the bellows pipe 52 when the display unit 3 is rotated to the closing position can be suppressed to be small as shown in FIG. 5. As a result, when the display unit 3 is rotated, an unreasonable bending force is not applied to the bellows pipe 52 thereby improving the durability of the bellows pipe 52.

Meanwhile, according to the first embodiment, when the temperature of the semiconductor package and the temperature of the display housing reach their predetermined values, the electric fan is started. However, the present invention is not restricted to this. For example, it is permissible to adjust the air amount of the cooling air or the flow amount of the cooling medium according to a temperature signal outputted from the temperature sensor.

Further, the pump and accumulator do not always have to be built together with the intermediate cooling unit and the pump and accumulator may be installed halfway of the second pipe line. Because with this structure, cooling medium cooled by the radiator is introduced to the pump and accumulator, thermal influence upon the pump and accumulator can be suppressed thereby improving the reliability of the operation.

Figure 14:
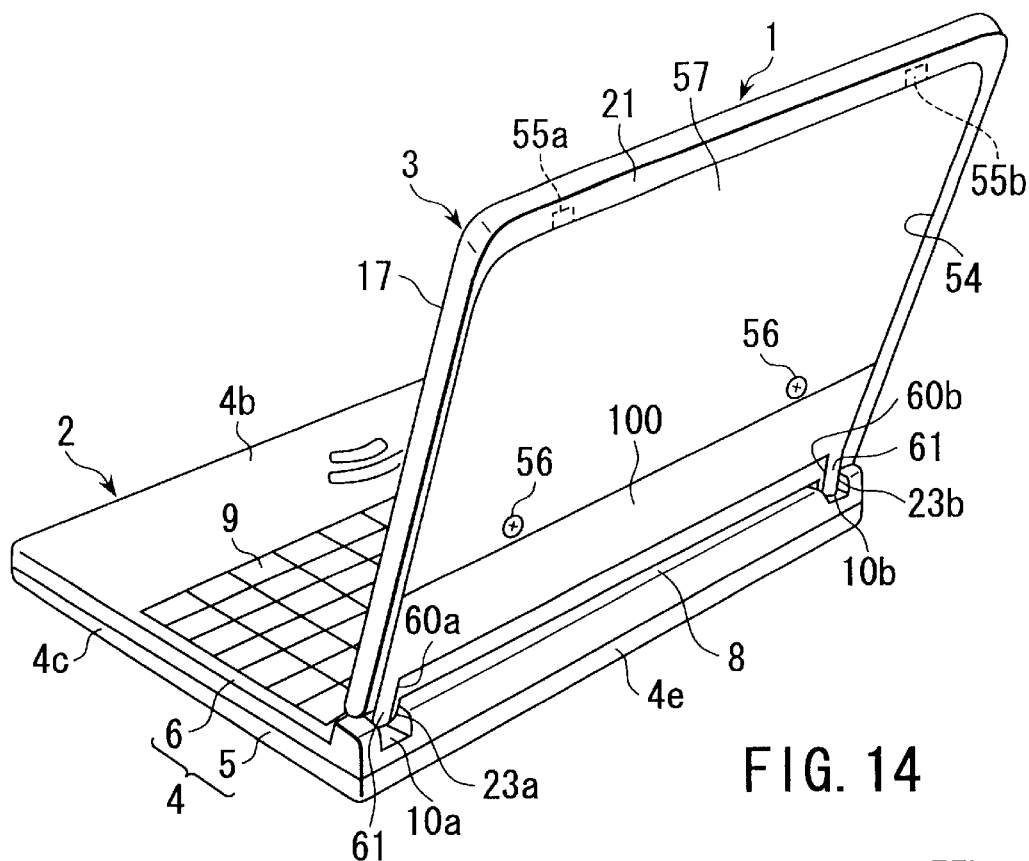
FIG. 14 is a perspective view of the portable computer according to a second embodiment of the present invention.

The present invention is not restricted to the above-described first embodiment. A second embodiment of the present invention shown in FIG. 14 will be described.

The second embodiment is different from the first embodiment in that the lids 61 which cover the opening portions 60a and 60b in the leg portions 23a and 23b are connected to each other through a connecting panel 100. Other basic structure of the portable computer 1 is the same as the first embodiment.

The connecting panel 100 is an elongated plate extending in the width direction of the display housing 17. The connecting panel 100 is fitted detachably in an end portion adjacent the leg portions 23a and 23b of the mounting port 54 of the display housing 17 and functions as a cover portion for covering this mounting port 54 partially. This connecting panel 100 is located on the same plane as the rear face 21 of the display housing 17 and the protective layer 57 of the heat radiator 32.

Figure 15:
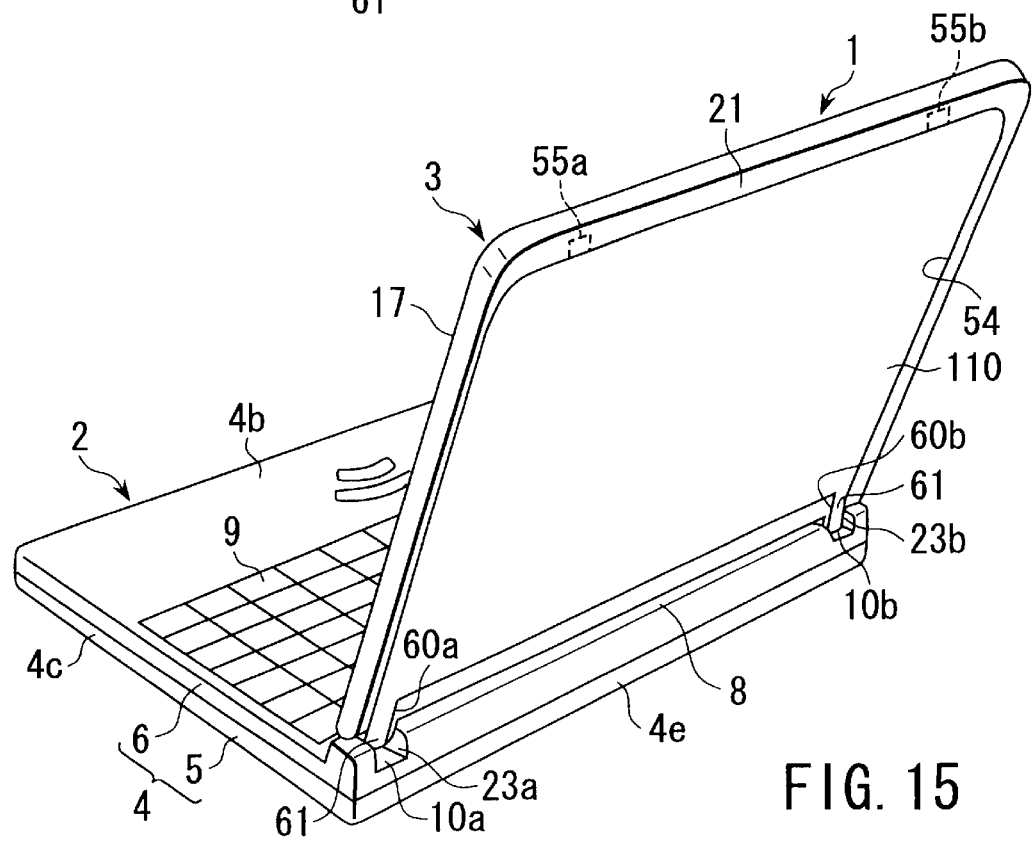
FIG. 15 is a perspective view of the portable computer according to a third embodiment of the present invention.

FIG. 15 shows a third embodiment of the present invention.

This third embodiment is a further development of the second embodiment. According to the third embodiment, a connecting panel 110 for connecting the lids 61 is large enough to cover the mounting port 54 entirely. The connecting panel 110 is fit to the mounting port 54 detachably such that it is overlaid on the first heat radiating plate 43a of the heat radiator 32 supported by the display housing 17. Thus, the first heat radiating plate 43a of the heat radiator 32 is not equipped with any protective layer like shown in the first embodiment and this connecting panel 110 functions a protective layer which covers the first heat radiating plate 43a.

Figure 16:
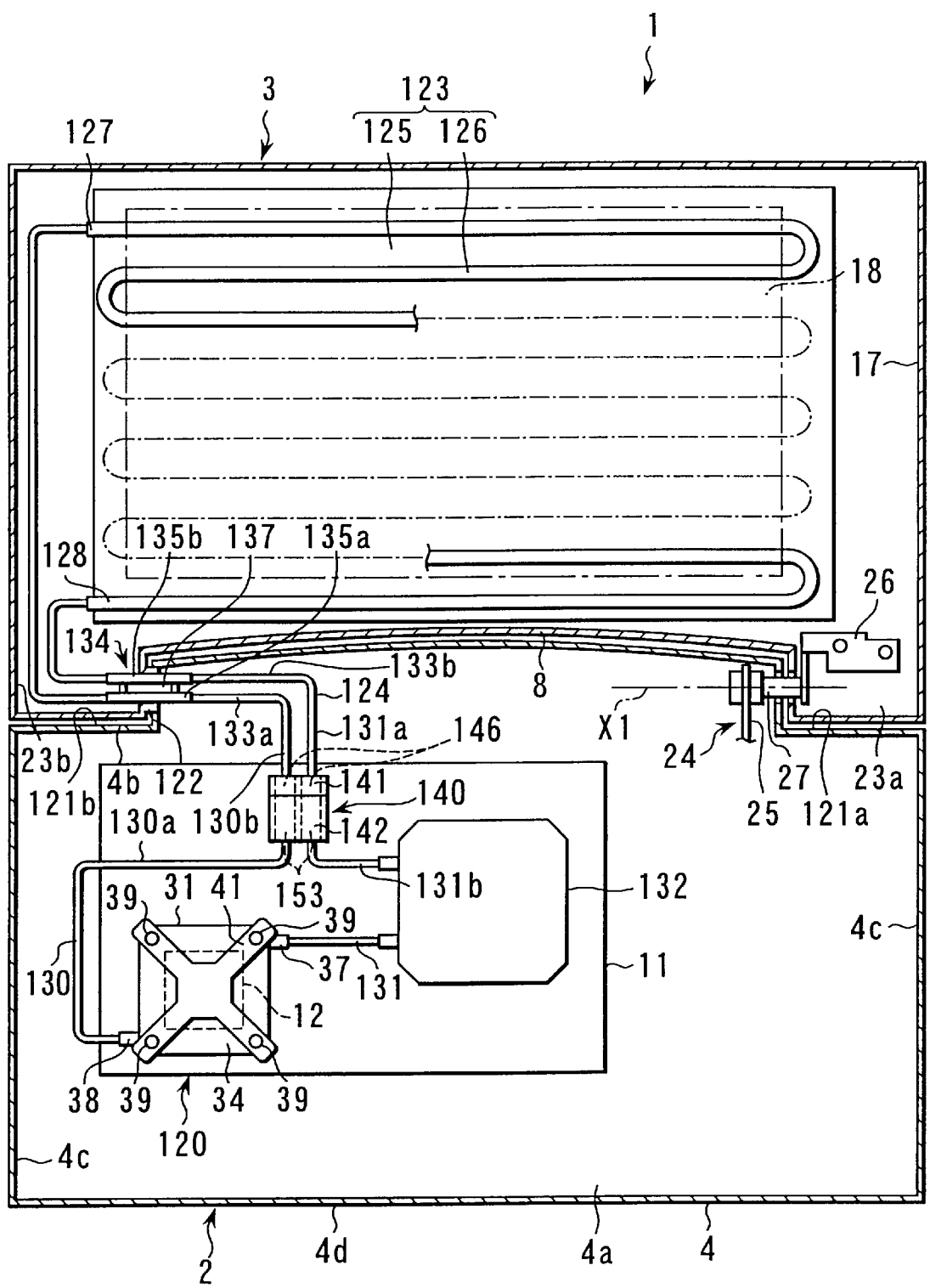
FIG. 16 is a sectional view of the portable computer having a liquid cooling type cooling unit according to a fourth embodiment of the present invention.
Figure 17:
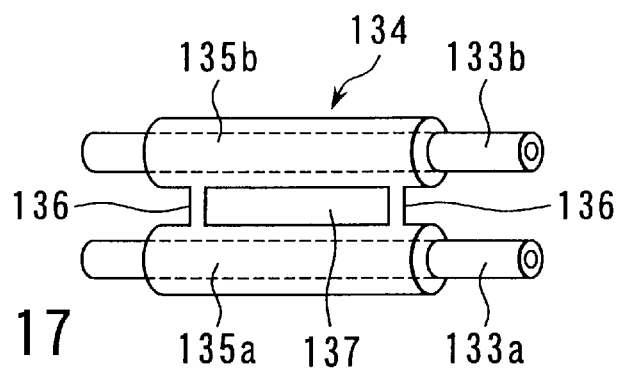
FIG. 17 is a perspective view of a holder for maintaining an interval between a first pipe line and a second pipe line constant in the fourth embodiment of the present invention.
Figure 18A:
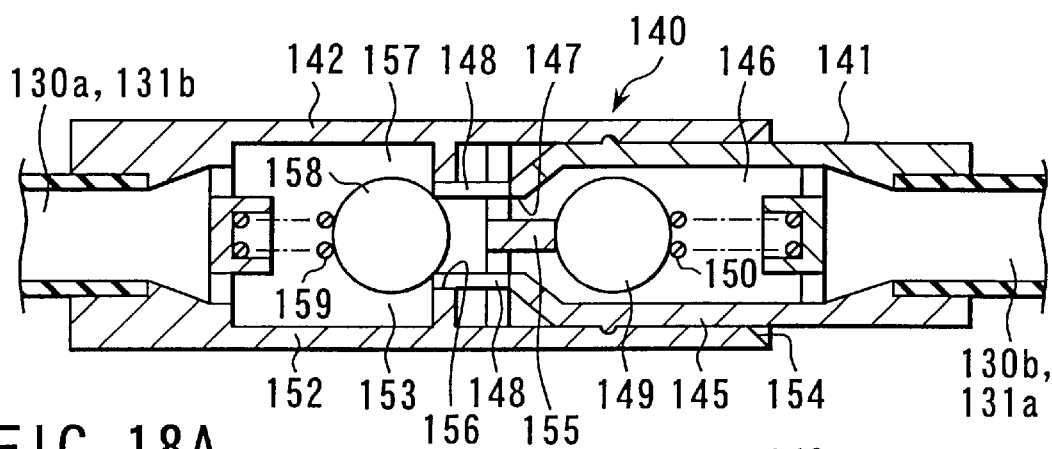
FIG. 18A is a sectional view of a joint indicating a state in which a first joint portion and a second joint portion are joined together in the fourth embodiment of the present invention.
Figure 18B:
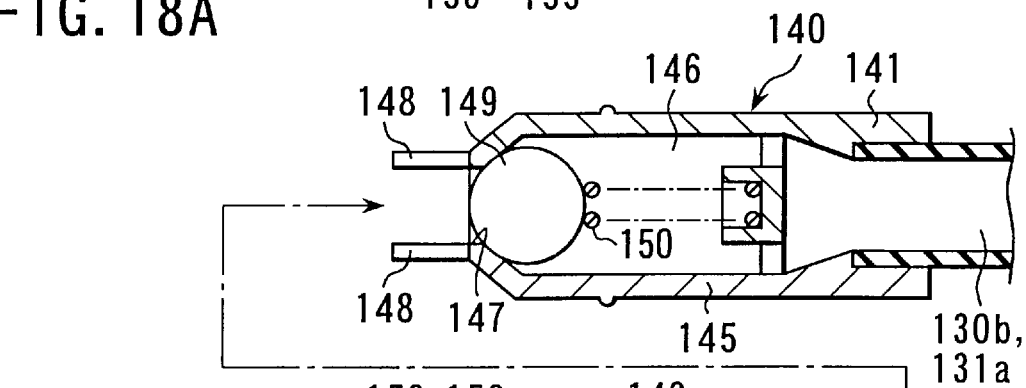
FIG. 18B is a sectional view of the joint indicating a state in which the first joint portion and the second joint portion are separated from each other in the fourth embodiment of the present invention.
Figure 18B:
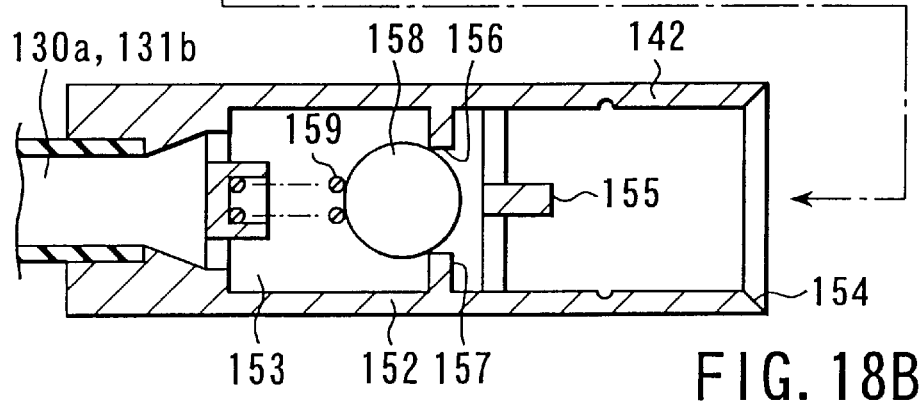

Further, FIGS. 16–18 show a fourth embodiment of the present invention.

According to the fourth embodiment, the structure of a cooling unit 120 for cooling mainly the semiconductor package 12 is different from that of the first embodiment and other basic structure of the portable computer 1 is the same as the first embodiment. Thus, for the fourth embodiment, like reference numerals are attached to the same component as the first embodiment and a description thereof is omitted.

As shown in FIG. 16, the convex portion 8 located at the rear end portion of the first housing 4 is so constructed that both ends thereof are located inside in the width direction of the first housing 4 with respect to the side wall 4c of the first housing 4. At the rear end portion of the first housing 4 are formed a pair of display supporting portions 121a and 121b which are specified by both end faces of the convex portion 8 and a top face of the upper wall 4b.

The leg portions 23a and 23b of the display housing 17 are introduced to the display supporting portions 121a and 121b. These leg portions 23a and 23b have side faces opposing both end faces of the convex portion 8.

The hinge shaft 27 of the hinge device 24 is extended horizontally such that it passes through the right end face of the convex portion 8 and the right side face of the leg portion 23a. The leg portion 23b located on the left opposite to the hinge device 24 has a cylindrical guide 122 protruded from a side face thereof toward the left end face of the convex portion 8. The guide 122 passes through the left end face of the convex portion 8 rotatably such that it is open inside the convex portion 8. Thus, the inside of the first housing 4 and the inside of the display housing 17 communicate with each other through the guide 122 and the left leg portion 23b.

The cooling unit 120 for cooling the semiconductor package 12 comprises a heat receiving head 31 accommodated inside the first housing 4, a heat radiator 123 accommodated inside the display housing 17 and a circulating path 124 for connecting the heat receiving head 31 and the heat radiator 123.

The heat radiator 123 has a flat heat radiating plate 125 and a meanderingly bent heat radiating pipe 126. The heat radiating plate 125 is composed of, for example, metallic material having excellent heat conductivity like aluminum alloy. The heat radiating plate 125 is fixed to an inside face of the display housing 17 behind the liquid crystal display panel 18 with fixing means such as screws, adhesive agent and the like, so that it is thermally connected to the display housing 17.

The heat radiating pipe 126 is composed of aluminum alloy or copper base metallic material having an excellent heat conductivity. The heat radiating pipe 126 is fixed to the heat radiating plate 125 by bonding or soldering means so that it is thermally connected to this heat radiating plate 126. The heat radiating pipe 126 is equipped with a refrigerant intake 127 and a refrigerant outlet 128. The refrigerant intake 127 and the refrigerant outlet 128 are located at the left end portion of the heat radiator 123.

The circulating path 124 includes a first pipe line 130 and a second pipe line 131. These pipe lines 130 and 131 are composed of flexible material like silicone resin, for example. The first pipe line 130 is intended for connecting the refrigerant outlet 38 of the heat receiving head 31 to the refrigerant intake 127 of the heat radiating pipe 126. After introduced to the left end portion of the convex portion 8 inside the first housing 4, this first pipe line 130 is introduced into the display housing 17 through the guide 122 and the inside of the leg portion 23b on the left. The second pipe line 131 is intended for connecting the refrigerant outlet 128 of the heat radiating pipe 126 to the refrigerant intake 37 of the heat receiving head 31. After introduced to the left end portion of the convex portion 8 inside the first housing 4, the second pipe line 131 is introduced to the inside of the display housing 17 through the guide 122 and the leg portion 23b on the left side.

Thus, the refrigerant flow paths 36 of the heat receiving head 31 is connected to the heat radiating pipe 126 of the heat radiator 123 through the first and second pipe lines 130 and 131. The refrigerant flow paths 36, the heat radiating pipe 126 and the first/second pipe lines 130 and 131 are filled with liquid-like cooling medium.

A pump 132 is installed halfway of the second pipe line 131. When the power of the portable computer 1 is turned on, the pump 132 is started so as to send out cooling medium to the heat receiving head 31. As a result, the cooling medium is introduced to the heat radiator 123 from the heat receiving head 31 through the first pipe line 130 and after flowing through the heat radiating pipe 126 in this heat radiator 132, returned to the pump 132 through the second pipe line 131.

As shown in FIG. 16, the first and second pipe lines 130 and 131 have intermediate portions 133a and 133b. The intermediate portions 133a and 133b exist between the convex portion 8 and the leg portion 23b of the display housing 17. The intermediate portions 133a and 133b are extended horizontally along the axis X1 of the hinge shaft 27 such that they are disposed in parallel to each other with a gap therebetween.

The intermediate portions 133a and 133b of the first and second pipes 130 and 131 are provided with a holder 134 for keeping constant the gap between these intermediate portions 133a and 133b. The holder 134 is composed of material hard to transmit heat. As shown in FIG. 17, the holder 134 has a first support pipe 135a and a second support pipe 135b. The first support pipe 135a supports the intermediate portion 133a of the first pipe line 130 rotatably in an axial direction. The second support pipe 135b supports the intermediate portion 133b of the second pipe line 131 rotatably in an axial direction.

The first and second support pipes 135a and 135b are linked through a pair of columns 136. The columns 136 are extended in the diameter direction of the first and second support pipes 135a and 135b such that they are disposed between both end portions of these support pipes 135a and 135b. Thus, the first and second support pipes 135a and 135b are disposed in parallel to each other across a heat insulating gap 137.

As shown in FIG. 16, the first and second pipe lines 130 and 131 are divided to upstream portions 130a and 131a and downstream portions 130b and 131b inside the first housing 4. These upstream portions 130a and 131a and the downstream portions 130b and 131b are joined detachably through a joint 140. As shown in FIGS. 18A and 18B, the joint 140 has a first joint portion 141 and a second joint portion 142. The first joint portion 141 is connected to the downstream portion 130b of the first pipe line 130 and the upstream portion 131a of the second pipe line 131. The second pipe portion 142 is connected to the upstream portion 130a of the first pipe line 130 and the downstream portion 131b of the second pipe line 131.

The first joint portion 141 has a hollow cylindrical body 145. A pair of refrigerant flow paths 146 are formed inside the body 145. The refrigerant flow paths 146 are connected to the downstream portion 130b of the first pipe line 130 and the upstream portion 131a of the second pipe line 131. Each of the refrigerant flow paths 146 has a valve hole 147 which is open to an end of the body 145. A pair of pressing rods 148 protruding from the body 145 through an opening edge portion of the valve hole 147 are provided at a front end of the body 145.

A ball-like valve body 149 is accommodated in each refrigerant flow path 146 and used as a closing means. The valve body 149 is supported by the body 145 and can approach and leaves the valve hole 147, always pressed toward the valve hole 147 by a spring 150. Thus, when the first joint portion 141 is separated from the second joint portion 142, the valve body 149 remains in firm contact with the opening edge portion of the valve hole 147, closing the valve hole 147.

The second joint portion 142 has a hollow cylindrical body 152. A pair of refrigerant flow paths 153 are formed inside the body 152. The refrigerant flow paths 153 are connected to the upstream portion 130a of the first pipe line 130 and the downstream portion 131b of the second pipe line 131. Each of the refrigerant flow paths 153 has a fitting hole 154, which is open to a front end of the body 152. The body 145 of the first joint portion 141 removably secured to the fitting hole 154 detachably.

As shown in FIG. 18B, a pressing protrusion 155 and a partition wall 157 having a valve hole 156 are provided in the middle part of the refrigerant flow path 153. The protrusion 155 extends toward the fitting hole 154. The partition wall 157 opposes the fitting hole 154 across the pressing protrusion 155. A ball-like valve body 158 is accommodated as a closing means between the partition wall 157 and the other end of the refrigerant flow path 153. The valve body 158 is supported by the body 152 and can approach and leave the valve hole 156 and is always pressed toward the valve hole 156 by a spring 159. Thus, while the first joint portion 141 is separated from the second joint portion 142, the valve body 158 remains in firm contact with the opening edge portion of the valve body 156, closing the valve hole 156.

When as shown in FIG. 18A, the body 145 of the first joint portion 141 is fit to the fitting holes 154 in the second joint portion 142, the pressing protrusions 155 of the second joint portion 142 enter the valve holes 147 in the first joint portion 141.

The protrusions 155 strike the valve bodies 149. Consequently, the valve bodies 149 are pushed and leave the opening edge portions of the valve holes 147, in spite of the force of the springs 150. The valve hole 147 are thereby opened.

At the same time, the pressing rods 148 of the body 145 passes over the periphery of the pressing protrusions 155 and enter the valve holes 156 in the joint portion 142. The rods 148 strike the valve bodies 158. As a result, the valve bodies 158 are pushed and leave the opening edge portion of the valve holes 156, against the force of the springs 159. The valve holes 156 are thereby opened.

Since the first joint portion 141 is connect with the second joint portion 142, the refrigerant flow paths 146 and 153 communicate with each other through the valve holes 147 and 156.

When the first joint portion 141 is separated from the second joint portion 142 as shown in FIG. 18B, the valve bodies 149 are no longer pressed by the pressing protrusions 155. At the same time, the valve bodies 158 are no longer pressed by the pressing rods 148. Thus, the valve bodies 149 and 158 are pressed against the opening edge portions of the valve holes 147 and 156 by the springs 150 and 159. The bodies 149 and 158 seal the valve holes 147 and 156. Thus, the refrigerant flow paths 146 and 153 continuous to the first and second pipe lines 130 and 131 are automatically closed, thereby preventing a leakage of the cooling medium.

If the IC chip 14 of the semiconductor package 12 is heated in the portable computer 1 having such a structure, heat of the IC chip 14 is transmitted to the heat transmitting case 34 of the heat receiving head 31. Because the cooling medium is supplied to the refrigerant flow paths 36 of this heat transmitting case 34, heat transmitted to the heat transmitting case 34 is transferred to the cooling medium flowing through the refrigerant flow paths 36 from the heat transmitting case 34. After heated by heat exchange by means of this heat receiving head 31, the cooling medium is introduced to the heat radiator 123 of the display unit 3 through the first pipe line 130, so that heat of the IC chip 14 is transferred to the heat radiator 123 through a flow of the cooling medium.

The cooling medium introduced to the heat radiator 123 flows along the meandering heat radiating pipe 126. In this flow process, heat absorbed in the cooling medium is transmitted to the heat radiating pipe 126 and diffused by heat conductivity to the heat radiating plate 125. Because the heat radiating plate 125 is thermally connected to the display housing 17, heat transferred to the heat radiating plate 125 is diffused by heat conductivity to the display housing 17 and then, discharged into the atmosphere from the surface of the display housing 17.

The cooling medium cooled by heat exchange by means of the heat radiating pipe 126 is returned to the pump 132 through the second pipe line 131 and after pressurized by this pump 132, supplied to the heat receiving head 31.

The first pipe line 130 in which the cooling medium heated by heat exchange by means of the heat receiving head 31 flows and the second pipe line 131 in which the cooling medium cooled by heat exchange by means of the heat radiator 123 extend between the first housing 4 and the display housing 17. Then, the intermediate portion 133a of the first pipe line 130 and the intermediate portion 133b of the second pipe line 131 are held by the first and second support pipes 135a and 135b in the holder 134. Consequently, the gap between the first pipe line 130 and the second pipe line 131 is maintained constant and the gap between the first pipe line 130 and the second pipe line 131 is thermally shut down by the gap 137 between the first and second support pipe lines 135a and 135b.

Thus, although the first pipe line 130 in which the heated cooling medium flows and the second pipe line 131 in which the cooled cooling medium flows pass inside the guide 122 such that they adjoin each other, a undesired heat exchange between the adjacent pipe lines 130 and 131 can be prevented. Therefore, transmission efficiency of heat from the heat receiving head 31 to the heat radiator 123 can be raised, thereby maintaining heat radiation performance of the semiconductor package 12.

On the other hand, a procedure for taking the display unit 3 out of the first housing 4 in the portable computer 1 having such a structure will be described. First, the top cover 6 of the first housing 4 is removed from the base 5 so as to expose the first and second pipe lines 130 and 131 and the joint 140 accommodated in the first housing 4.

Next, the first joint portion 141 and the second joint portion 142 of the joint 140 are separated from each other and the first and second pipe lines 130 and 131 are divided to the upstream portions 130a and 131a and the downstream portions 130b and 131b inside the first housing 4. Consequently, the circulating path 124 is divided between the first housing 4 and the display unit 3. Thus, with the heat receiving head 31 remaining in the first housing 4, the display unit 3 can be removed from the first housing 4 or can be installed onto the first housing 4.

For the reason, when attaching or detaching the display unit 3 to/from the first housing 4, it is not necessary to release thermal connection between the heat receiving head 31 and the semiconductor package 12 or thermally connect again, so that the procedure for disassembly/assembly of the thermal connecting portion between the heat receiving head 31 and the semiconductor package 12 is not required. Therefore, no unreasonable force is applied to the precision semiconductor package 12 and the positional relationship between the semiconductor package 12 and the heat receiving head 31 is not changed, thereby maintaining reliability of heat transfer favorably.

Further, if the first joint portion 141 is separated from the second joint portion 142, the valve holes 147 and 156 in the respective joint portions 141 and 142 are automatically shut down by the valve bodies 149, 158. Thus, a leakage of the cooling medium can be prevented and any special procedure for sealing a dividing portion between the first and second pipe lines 130 and 131 is not required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cooling unit for use in an electronic apparatus having a computer main body containing a heat generating component and a display unit supported by said computer main body, said cooling unit comprising:
   a heat receiving portion thermally connected to said heat generating component and accommodated in said computer main body;
   a heat exchanging portion installed on said display unit;
   circulating means for circulating cooling medium between said heat receiving portion and said heat exchanging portion, said circulating means having a pipe line for introducing cooling medium heated by said heat receiving portion to said heat exchanging portion; and
   intermediate cooling means installed in said pipe line, said intermediate cooling means forcing the heated cooling medium flowing from said heat receiving portion to said heat exchanging portion to be cooled.

2. A cooling unit according to claim 1, wherein said intermediate cooling means comprises a main body having a path in which the heated cooling medium flows and a fan for supplying cooling air to said main body.

3. A cooling unit according to claim 2, wherein said main body comprises a cooling air path in which said cooling air flows and a plurality of heat radiating fins exposed on said cooling air path, said cooling air path being thermally connected to said path.

4. A cooling unit according to claim 2, wherein said circulating means includes a pump for forcing the cooling medium to be circulated between said heat receiving portion and said heat exchanging portion and an accumulator for absorbing a pulsation of the cooling medium discharged from said pump.

5. A cooling unit according to claim 4, wherein said pump and said accumulator are incorporated in said main body integrally.

6. An electronic apparatus comprising:
   a housing containing a heat generating component;
   a display unit supported by said housing;
   a heat receiving portion accommodated in said housing and thermally connected to said heat generating component;
   a heat exchanging portion installed on said display unit;
   circulating means for circulating cooling medium between said heat receiving portion and said heat exchanging portion, said circulating means being disposed throughout said housing and said display unit and having a pipe line for introducing cooling medium heated by said heat receiving portion to said heat exchanging portion; and
   intermediate cooling means installed in said pipe line of said circulating means, said intermediate cooling means forcing the heated cooling medium flowing from said heat receiving portion to said heat exchanging portion to be cooled.

7. An electronic apparatus according to claim 6, wherein said display unit contains a display housing incorporating the display panel, said heat exchanging portion has thermally conductive heat radiating plates supported by said display housing, said heat radiating plates being provided with heat radiating path for introducing the heated cooling medium.

8. An electronic apparatus according to claim 6, wherein said circulating means includes a pump for forcing said cooling medium to be circulated between said heat receiving portion and said heat exchanging portion and said intermediate cooling means contains a main body having a path in which the heated cooling medium flows and a fan for supplying cooling air to said main body.

9. An electronic apparatus according to claim 8, wherein the pump of said circulating means is driven when the power of said electronic apparatus is turned on and said fan is driven when the temperature of said heat generating component reaches a predetermined value.

10. An electronic apparatus according to claim 9, wherein said fan is driven when the temperature of said display unit reaches a predetermined value.

11. An electronic apparatus comprising:
   a first housing containing a heat generating component;
   a second housing, said second housing being journaled detachably on a rear end of said first housing through a hinge device having a hinge shaft extending in the width direction of said first housing and having a rear face which is directed backward of said first housing when said second housing is rotated to a posture in which it stands up from the rear end of said first housing;
   a heat receiving portion accommodated inside said first housing and thermally connected to said heat generating component;
   a heat exchanging portion installed on said second housing, said heat exchanging portion being capable of being taken out of said rear face; and
   circulating means for circulating the cooling medium between said heat receiving portion and said heat exchanging portion, said circulating means comprising a first pipe line for introducing cooling medium heated by said heat receiving portion to said heat exchanging portion and a second pipe line for introducing cooling medium cooled by heat exchange by means of said heat exchanging portion to said heat receiving portion, said first and second pipe lines being disposed throughout the inside of said first housing and the inside of said second housing via backward of said hinge shaft, said rear face of said second housing having at least an opening portion at a position corresponding to said first and second pipe lines, said opening portion being covered with a removable lid.

12. An electronic apparatus according to claim 11, wherein at least a portion passing behind the hinge shaft, of each of said first and second pipe lines has flexibility.

13. An electronic apparatus according to claim 11, wherein portions extending between said first housing and said second housing of said first and second pipe lines are disposed apart from each other in the width direction of the housings.

14. An electronic apparatus according to claim 12, wherein said heat exchanging portion contains thermally conductive heat radiating plates having a heat radiating path for introducing the heated cooling medium and said second housing contains a mounting hole in which said heat radiating plates are to be embedded in a rear face thereof, said mounting hole being continuous to said opening portions.

15. An electronic apparatus according to claim 14, wherein a face on an opposite side to said heat radiating path, of said heat radiating plate is covered with a protective layer having a lower heat conductivity than the heat radiating plate and said protective layer is exposed out of said second housing through said mounting hole.

16. An electronic apparatus according to claim 14, wherein said lid is provided integrally with a cover portion for covering said heat radiating plate, said cover portion being fit in said mounting hole detachably.

17. An electronic apparatus according to claim 11, further comprising intermediate cooling means installed halfway of said first pipe line, said intermediate cooling means forcing heated cooling medium flowing from said heat receiving portion to said heat exchanging portion to be cooled.

18. An electronic apparatus comprising:
   a housing accommodating a heat generating component and being capable of being opened upward;
   a display unit supported by said housing;
   a heat receiving portion accommodated in said housing and thermally connected to said heat generating component;
   a heat exchanging portion installed on said display unit; and
   circulating means for circulating cooling medium between said heat receiving portion and said heat exchanging portion, said circulating means comprising a first pipe line for introducing cooling medium heated by said heat receiving portion to said heat exchanging portion and a second pipe line for introducing cooling medium cooled by heat exchange by means of said heat exchanging portion to said heat receiving portion, said first and second pipe lines being disposed throughout the inside of said housing and the inside of said display unit and being divided to upstream portions and downstream portions inside said housing, said upstream portions and said downstream portions being connected detachably through a joint, said joint having closing means for closing said first and second pipe lines when said first and second pipe lines are divided to the upstream portions and the downstream portions.

19. An electronic apparatus according to claim 18, wherein said display unit has a pair of leg portions disposed apart from each other in the width direction thereof, said leg portions being supported rotatably by said housing.

20. An electronic apparatus according to claim 19, wherein said first and second pipe lines are placed through the inside of at least any one of said leg portions and thermally insulated from each other inside said leg portions.

* * * * *